United States Patent
Watanabe

(10) Patent No.: US 7,385,711 B2
(45) Date of Patent: Jun. 10, 2008

(54) IMAGE FORMATION SYSTEM

(75) Inventor: Masao Watanabe, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1091 days.

(21) Appl. No.: 10/600,449

(22) Filed: Jun. 23, 2003

(65) Prior Publication Data
US 2005/0259287 A1 Nov. 24, 2005

(30) Foreign Application Priority Data
Jul. 2, 2002 (JP) .............................. 2002-193598

(51) Int. Cl.
H04N 1/50 (2006.01)
G06F 3/12 (2006.01)
(52) U.S. Cl. .................... 358/1.12; 358/2.1; 358/1.13; 358/1.15; 358/1.4; 358/1.11; 709/201
(58) Field of Classification Search ............... 358/1.12, 358/2.1, 1.13, 1.15, 1.4, 1.11; 709/201
See application file for complete search history.

(56) References Cited

U.S. PATENT DOCUMENTS 5,850,478 A    12/1998  Suzuki et al. ............... 382/204
2001/0021036 A1 *  9/2001  Nimura et al. ............. 358/1.12

FOREIGN PATENT DOCUMENTS

| JP | 2000-112688 | | 4/2000 |
|---|---|---|---|
| JP | 2000-112702 | | 4/2000 |
| JP | 2000112688 A | * | 4/2000 |
| JP | 2000-222148 | | 8/2000 |
| JP | 2000222148 A | * | 8/2000 |
| JP | 2002-086852 | | 3/2002 |
| JP | 2002086852 A | * | 3/2002 |
| JP | 2002-157102 | | 5/2002 |

* cited by examiner

Primary Examiner—Quang N. Vo
(74) Attorney, Agent, or Firm—Fitzpatrick, Cella, Harper & Scinto

(57) ABSTRACT

An image formation system comprises a color image formation unit of a color image formation apparatus and a black-and-white image formation unit of a black-and-white image formation apparatus. A determining unit determines whether each page in an input job having both color pages and black-and-whites pages is a color page or black-and-white page. A control unit controls the color image formation unit to form the color pages, and the black-and-white image formation unit to form the black-and-white pages, based on results from the determining unit. In the event that both color pages and black-and-white page are to be formed on a single sheet, a selecting unit selects between a first mode wherein all pages are formed with the color image formation unit, and a second mode wherein the color pages are formed with the color image formation unit and the black-and-white pages are formed with the black-and-white image formation unit.

28 Claims, 27 Drawing Sheets

IMAGE FORMATION SYSTEM

BACKGROUND OF THE INVENTION

1. Field of the Invention

The present invention relates to an image formation system wherein a color image formation apparatus and a black-and-white image formation apparatus are connected to a network.

2. Description of the Related Art

With regard to image formation of jobs containing color pages and black-and-white (hereafter may be also referred to as "monochrome" or may be abbreviated as "B/W" particularly in the drawings) pages, an apparatus proposed in Japanese Patent Laid-Open No. 2000-112688 is known as an image formation system which can automatically switch between a color image formation apparatus and a black-and-white image formation apparatus for forming images.

However, with the conventional method, image formation of jobs that include both color pages and black-and-white pages can be handled by forming the color pages with a color image formation apparatus, forming the black-and-white pages with a black-and-white image formation apparatus, and collating using an inserter, collator, hand feed tray, etc. However, in the event that there is both a color page and a black-and-white page to be formed on the same sheet, the image formation apparatus to be used for forming the images cannot be automatically determined. Also, even if the image formation apparatus to be used for forming images containing a color page and a black-and-white page on the same sheet could be automatically determined, the control of the color image formation apparatus and the black-and-white image formation apparatus needs to be changed according to the mixing method with the inserter, collator, hand feed tray, etc., and accordingly, such an arrangement could not be readily realized.

SUMMARY OF THE INVENTION

The present invention has been made in light of such problems, and accordingly, it is an object thereof to provide an image formation system that automatically judges whether a color image formation apparatus or a black-and-white image formation apparatus should be used to form a sheet that includes both a color page and a black-and-white page, and that control of the color image formation apparatus and the black-and-white image formation apparatus can be automatically changed according to the mixing method of an inserter, collator, hand feed tray, or the like.

According to a first aspect of the present invention, an image formation system, consisting of a color image formation apparatus and a black-and-white image formation apparatus, includes: a color image formation unit forming color images with the color image formation apparatus, a black-and-white image formation unit forming black-and-white images with the black-and-white image formation apparatus, and a determining unit determining whether each page in an input job, in which both a color page and a black-and-white page exist, is a color page or a black-and-white page. The image formation system further includes a control unit that controls the color image formation unit to form images for the color page, and controls the black-and-white image formation unit to form images for the black-and-white page, based on the determination results from the determining unit, and a selecting unit that selects between a first mode where, in the event that both a color page and black-and-white page are to be formed on a single sheet, all pages to be formed on that sheet are formed with the color image formation unit, and a second mode where, in the event that both a color page and black-and-white page are to be formed on a single sheet, the color page to be formed on that sheet is formed with the color image formation unit, and the black-and-white page to be formed on that sheet is formed with the black-and-white image formation unit.

According to a second aspect of the present invention, a control method, for an image formation system consisting of a color image formation apparatus and a black-and-white image formation apparatus, includes: forming color images with the color image formation apparatus, forming black-and-white images with the black-and-white image formation apparatus, and determining whether each page in an input job, in which both a color page and a black-and-white page exist, is a color page or a black-and-white page. The control method further includes controlling the color image formation step to form images for the color page, and controlling the black-and-white image formation step to form images for the black-and-white page, based on the determination results in the determining step, and selecting between a first mode where, in the event that both a color page and black-and-white page are to be formed on a single sheet, all pages to be formed on that sheet are formed in the color image formation step, and a second mode where, in the event that both a color page and black-and-white page are to be formed on a single sheet, a color page to be formed on that sheet is formed in the color image formation step, and black-and-white page to be formed on that sheet is formed in the black-and-white image formation step.

According to a third aspect of the present invention, a color image formation apparatus includes: a color image formation unit forming color images on sheets, a reception unit receiving image information, and a selecting unit selecting between a first mode where, in the event that both a color page and black-and-white page are to be formed on a single sheet, all pages to be formed on that sheet are formed with the color image formation unit, and a second mode where, in the event that both a color page and black-and-white page are to be formed on a single sheet, only a color page to be formed on that sheet is formed with the color image formation unit.

According to a fourth aspect of the present invention, a black-and-white image formation apparatus includes: a black-and-white image formation unit forming a black-and-white image on a sheet, a reception unit receiving image information, and a selecting unit selecting between a first mode where, in the event that both a color page and black-and-white page are to be formed on a single sheet, no image formation is performed by the black-and-white image formation unit, and a second mode where, in the event that both a color page and black-and-white page are to be formed on a single sheet, only the black-and-white page to be formed on that sheet is formed with the black-and-white image formation unit.

According to a fifth aspect of the present invention, a program is executed by an information processing apparatus connected to a color image formation apparatus and a black-and-white image formation apparatus, so as to cause the information processing apparatus to execute selection procedures for selecting one of a first mode where, in the event that both a color page and black-and-white page are to be formed on a single sheet, all pages to be formed on that sheet are formed with the color image formation unit, and a second mode where, in the event that both a color page and black-and-white page are to be formed on a single sheet, the color page to be formed on that sheet is formed with the color image formation apparatus, and the black-and-white page to be formed on that sheet is formed with the black-and-white image formation apparatus.

According to a sixth aspect of the present invention, an image formation system, consisting of a color image formation apparatus and a black-and-white image formation apparatus, includes: a color image formation unit for forming color images with the color image formation apparatus, and a black-and-white image formation unit for forming black-and-white images with the black-and-white image formation apparatus. In the event that a color page and a black-and-white page are to be formed on a sheet, all pages to be formed on the sheet are formed by the color image formation unit, and in the event that only color pages are to be formed on a single sheet, all pages to be formed on the sheet are formed by the color image formation unit. Further, in the event that only black-and-white pages are to be formed on a single sheet, all pages to be formed on the sheet are formed by the black-and-white image formation unit.

According to a seventh aspect of the present invention, with regard to a color image formation apparatus comprising a color image formation unit for forming color images on sheets, in the event that a color page and a black-and-white page are to be formed on a sheet, all pages to be formed on the sheet are formed by the color image formation unit. In the event that only color pages are to be formed on a single sheet, all pages to be formed on the sheet are formed by the color image formation unit, and in the event that only black-and-white pages are to be formed on a single sheet, no images are formed on the sheet by the color image formation unit.

According to an eighth aspect of the present invention, with regard to a black-and-white image formation apparatus comprising a black-and-white image formation unit for forming black-and-white images on sheets, in the event that a color page and a black-and-white page are to be formed on a sheet, no images are formed on the sheet by the black-and-white image formation unit. In the event that only color pages are to be formed on a sheet, no images are formed on the sheet by the black-and-white image formation unit, and in the event that only black-and-white pages are to be formed on a single sheet, all pages to be formed on the sheet are formed by the black-and-white image formation unit.

Thus, according to the present invention, forming both color pages and black-and-white pages on a single sheet can be carried out either by both the color image formation unit and the black-and-white image formation unit or by the color image formation unit alone. Further, the present invention can handle all methods for collating color pages and black-and-white pages.

Another advantage is that in the event of forming both color pages and black-and-white pages on a single sheet, it can be automatically selected whether the color image formation unit or the black-and-white image formation unit is to be used for image formation and printing, without requiring instructions from the user.

Further objects, features and advantages of the present invention will become apparent from the following description of the preferred embodiments (with reference to the attached drawings).

DESCRIPTION OF THE PREFERRED EMBODIMENTS

[Overview of the System]

Figure 1:
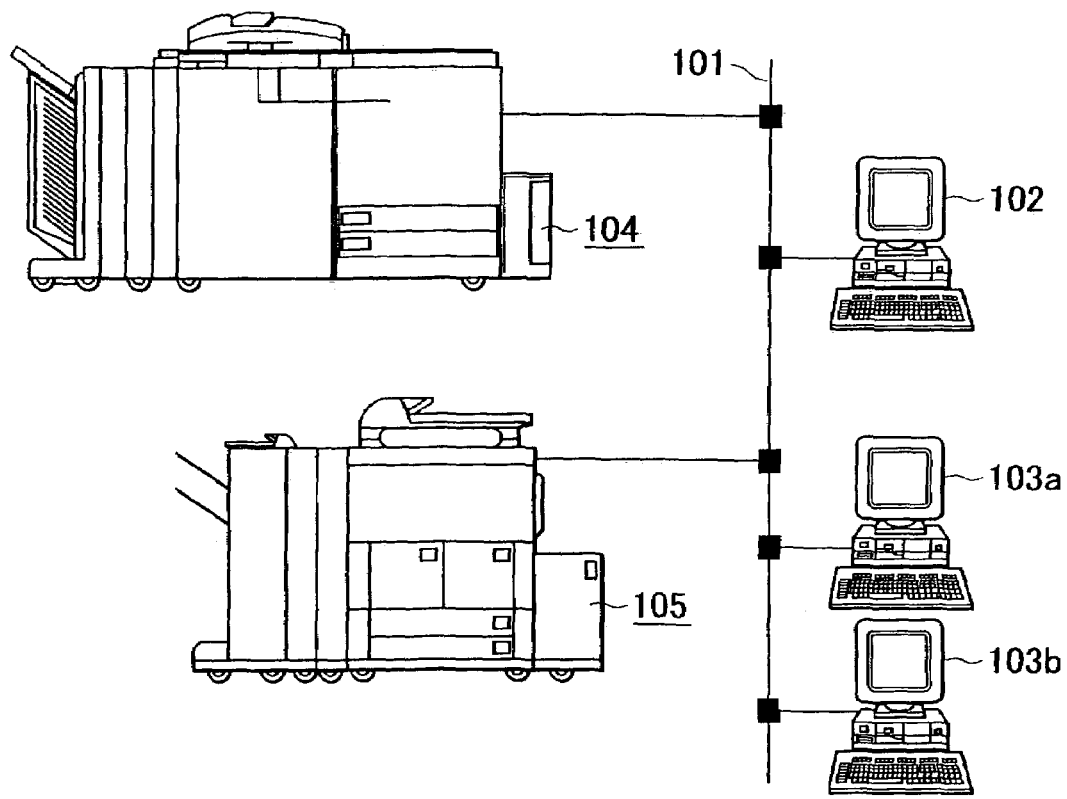
FIG. 1 is a diagram illustrating the overall system of an embodiment according to the present invention.
Figure 2:
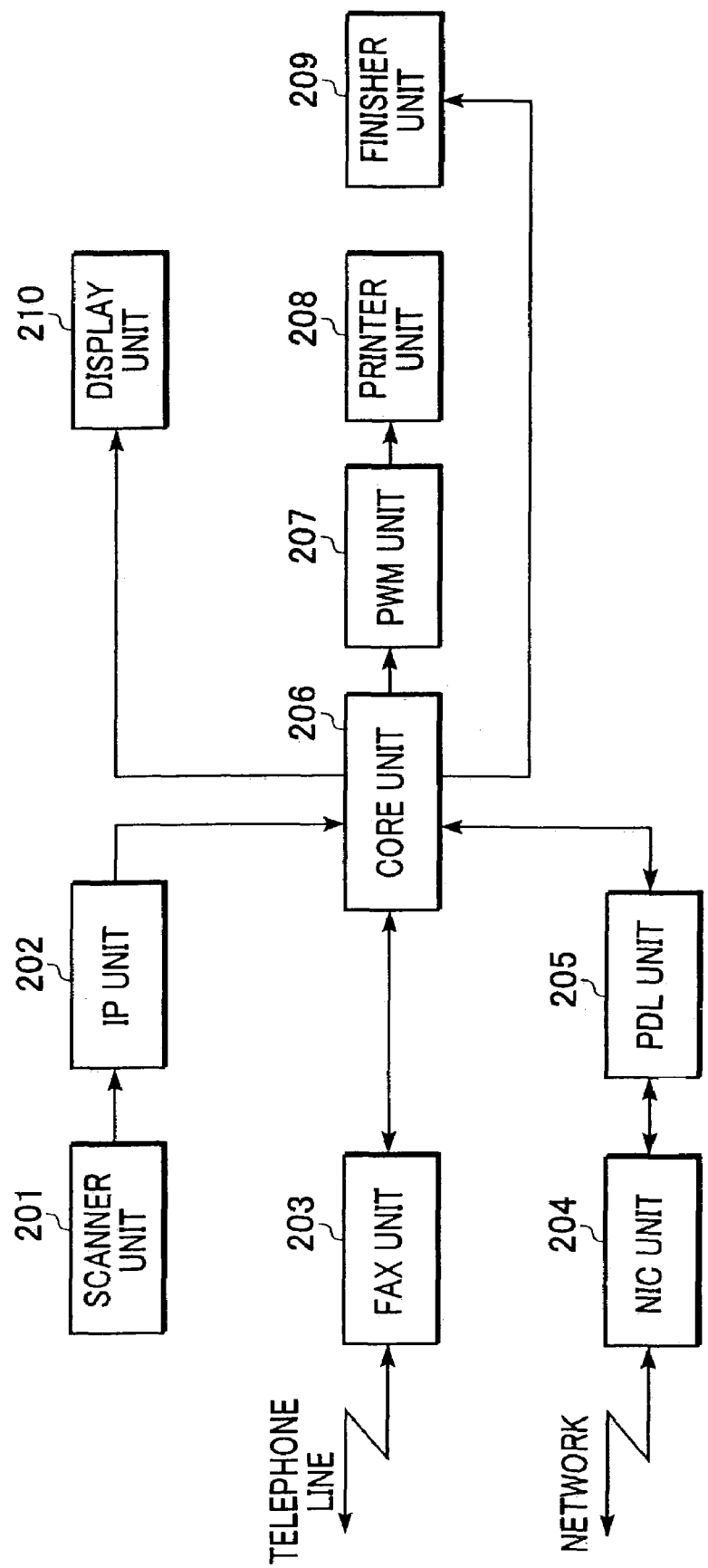
FIG. 2 is a block diagram of an image formation apparatus in its entirety.

FIG. 1 shows a conceptual diagram of the system according to an embodiment of the present invention. A computer 102 connected to a network 101 is a server computer, and computers 103a and 103b are client computers. Many other client computers (not shown) may also be connected thereto. Hereafter, the client computers will be represented by a reference numeral 103.

Further connected to the network 101 are MFPs (Multi-Function Printer) 104 and 105. Reference numeral 104 denotes a color MFP which is capable of scanning, printing, etc., in full-color, while 105 denotes a black-and-white MFP which performs monochrome scanning, printing, etc. Also, though not shown in the drawings, are other MFPs, scanners, printers, facsimiles, and other like devices which are also connected to the network 101.

Application software for carrying out what is known as DTP (Desktop Publishing) is run on the client computer 103, creating and editing various types of documents and images. The client computer 103 converts the created documents and images into PDL (Page Description Language), which is sent to the MFPs 104 and 105 via the network 101 and printed out.

The MFPs 104 and 105 both have communication means enabling exchange of information with the computers 102 and 103 via the network 101, and computers 102 and 103 are kept notified of the information and status of the MFPs 104 and 105. Further, the computers 102 and 103 have utility software to operate upon reception of such information, so that the MFPs 104 and 105 can be managed by the computers 102 and 103.

[Configuration of MFPs 104 and 105]

The configuration of the MFPs 104 and 105 will be described with reference to FIGS. 2 through 12. The difference between MFP 104 and MFP 105 is that one is a full-color apparatus while the other is a black-and-white apparatus, and the configuration of the full-color apparatus encompasses the configuration of the black-and-white apparatus in many ways, except for color processing. Accordingly, description will be made with regard to the full-color apparatus and description of the black-and-white apparatus will be added as necessary.

MFPs 104 and 105 each comprise a scanner unit 201 for reading images, an IP (image processing) unit 202 for processing image data thereof, a FAX unit 203 such as a facsimile or the like for transmitting and receiving images using telephone lines, a NIC (Network Interface Card) unit 204 for exchanging image data and device information using the network, and a PDL unit 205 for rendering the PDL transmitted from the client computer 103 into image signals. A core unit 206 temporarily holds the image signals, determines paths, etc., according to how the MFPs 104 and 105 are being used.

The image data output from the core unit 206 is sent to a printer unit 208, via a PWM (pulse width modulation) unit 207, for image formation. The sheets that have been printed at the printer unit 208 are sent to a finisher 209 where the sheets are sorted and finished.

Also, a display unit 210 is used for confirming the contents of images without printing out the image, or checking the way the image looks before printing, i.e., previewing.

[Configuration of Scanner Unit 201]

Figure 3:
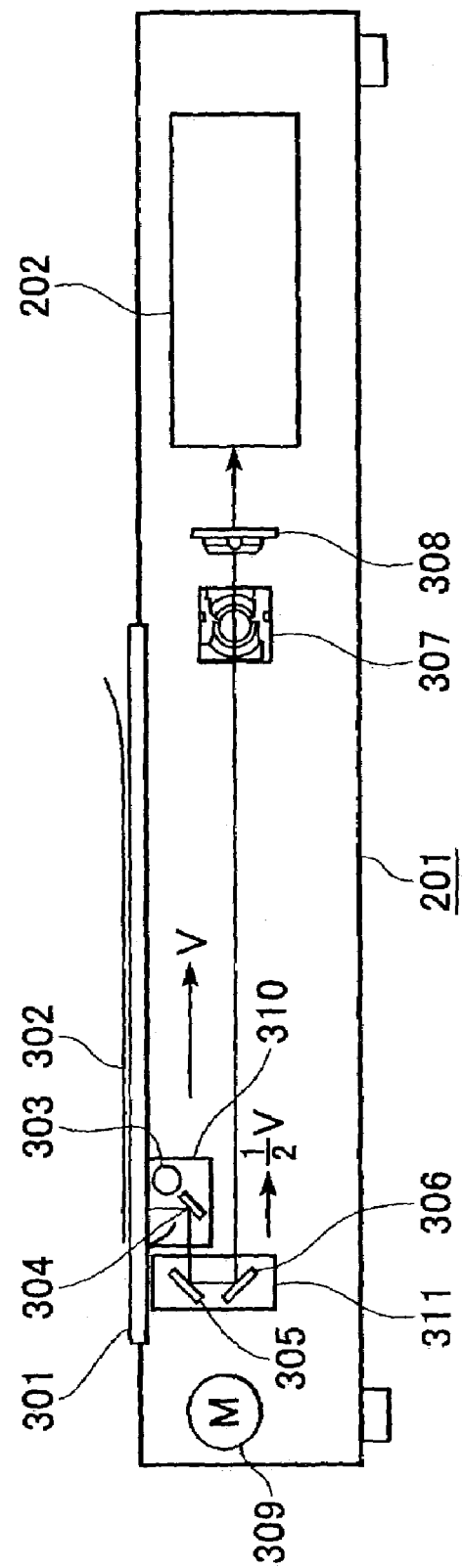
FIG. 3 is a diagram illustrating a scanner unit of the image formation apparatus.

The configuration of the scanner unit 201 will be described with reference to FIG. 3. Reference numeral 301 denotes an original table glass, where an original 302 to be read is placed. Light is cast onto the original 302 by an illumination lamp 303, the light reflected therefrom is reflected off of mirrors 304, 305, and 306, and is imaged onto a CCD 308 by a lens 307. A first mirror unit 310 including the mirror 304 and the illumination lamp 303 moves at a speed v, and a second mirror unit 311 including the mirrors 305 and 306 moves at a speed ½ v, so as to scan the entire face of the original 302. The first mirror unit 310 and the second mirror unit 311 are driven by a motor 309.

[Configuration of Image Processing Unit 202]

Figure 4:
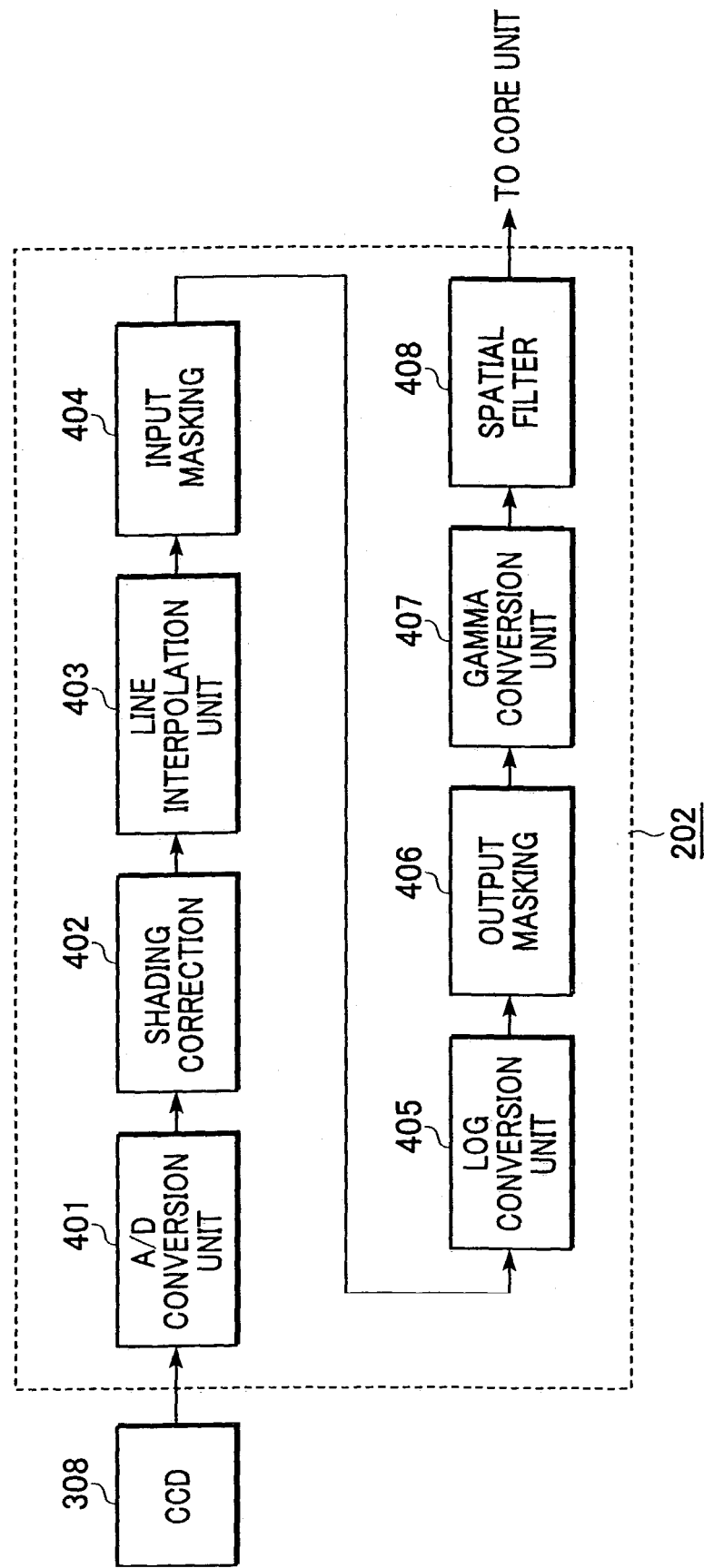
FIG. 4 is a diagram illustrating an IP unit of the image formation apparatus.

The IP unit 202 will be described with reference to FIG. 4. Input optical signals are converted into electric signals by the CCD sensor 308. The CCD sensor 308 has three RGB line color sensors, and image signals of each of R, G, and B are input to an A/D converting unit 401. The image signals are subjected to gain adjustment and offset adjustment here, and then are converted into 8-bit digital image signals R0, G0, and B0, for each color signal, at the A/D converter. Subsequently, known shading correction using a reference white plate is performed for each color at the shading correcting denoted by reference numeral 402. Further, the line sensors of the CCD sensor 308 for each color are positioned with a predetermined distance between one another, so spatial offset in the sub-scanning direction is corrected at a line delay adjustment circuit (line interpolation unit) 403.

Next, an input masking unit 404 serves as a unit for converting read color space, which is determined by the spectral properties of the RGB filter of the CCD sensor 308, into standard NTSC color space, and performs 3 by 3 matrix computation using a constant, unique to the device, which takes into consideration various properties such as the sensitivity properties of the CCD sensor 308 and the spectrum properties of the illumination lamp, and converts the input signals (R0, G0, and B0) into standard signals (RGB).

A luminance/level converting unit (LOG converting unit) 405 is configured of lookup table (LUT) RAM, and converts the RGB luminance signals into level signals C1, M1, and Y1.

Reference numeral 406 denotes an output masking/UCR circuit unit, for converting the M1, C1, and Y1 signals into Y, M, C, and K signals which are the toner colors of the image formation apparatus, using matrix computation, and corrects the C1, M1, Y1, and K1 signals based on the RGB signals read in by the CCD sensor 308 into CMYK signals based on the spectral distribution properties of the toner, and outputs the signals.

At a gamma correction unit 407, the image signals are converted into CMYK data for image output using the lookup table (LUT) RAM, taking the color properties of the toner into account, and at a spatial filter 408, the CMYK data subjected to sharpness or smoothing processing, and then sent to the core unit 206.

In the event of performing black-and-white image processing with the MFP 105, a monochrome single line CCD sensor may be used for A/D conversion and shading for one color, following which input/output making, gamma conversion, and spatial filtering are carried out in that order.

[Configuration of FAX Unit 203]

Figure 5:
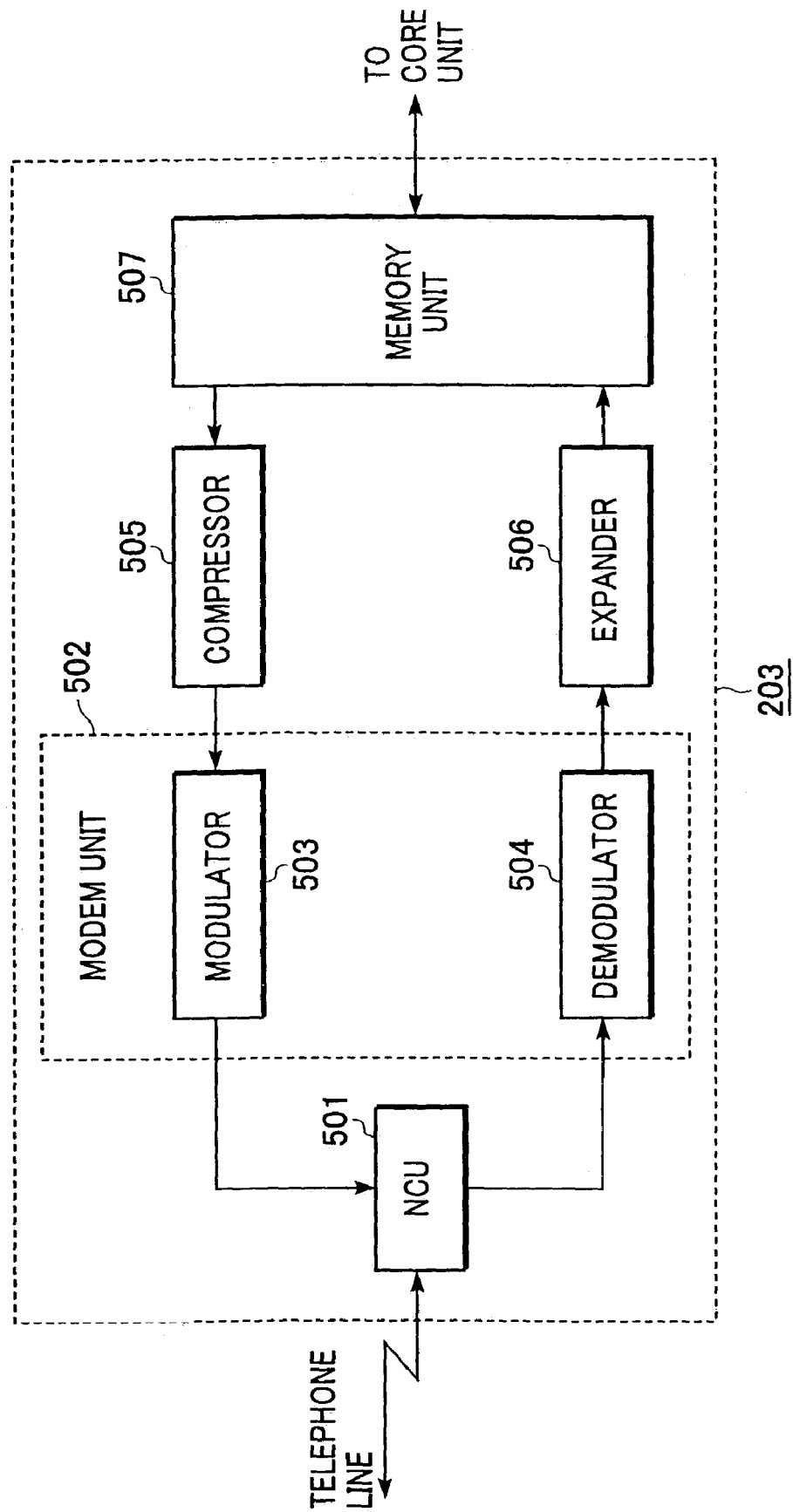
FIG. 5 is a diagram illustrating a FAX unit of the image formation apparatus.

The FAX unit 203 will be described with reference to FIG. 5. First, at the time of receiving, data coming over the telephone line is received with an NCU unit 501 and voltage conversion is performed, A/D conversion and demodulation operations are performed by a demodulator 504 in a modem unit 502, following which the data is rendered into raster data with an expanding unit 506. Generally, run-length or a like method is used for compression/expanding with facsimiles. The image converted into raster data is temporarily held by a memory unit 507, and following confirmation that are no transfer errors in the image data, sent to the core unit 206.

At the time of transmission, image signals in the form of a raster image coming from the core unit are subjected to compression by run-length or the like at a compression unit 505, and following D/A conversion and modulation operations at a modulating unit 503 within the modem unit 502, are sent over the telephone line via the NCU unit 501.

[Configuration of NIC Unit 204]

Figure 6:
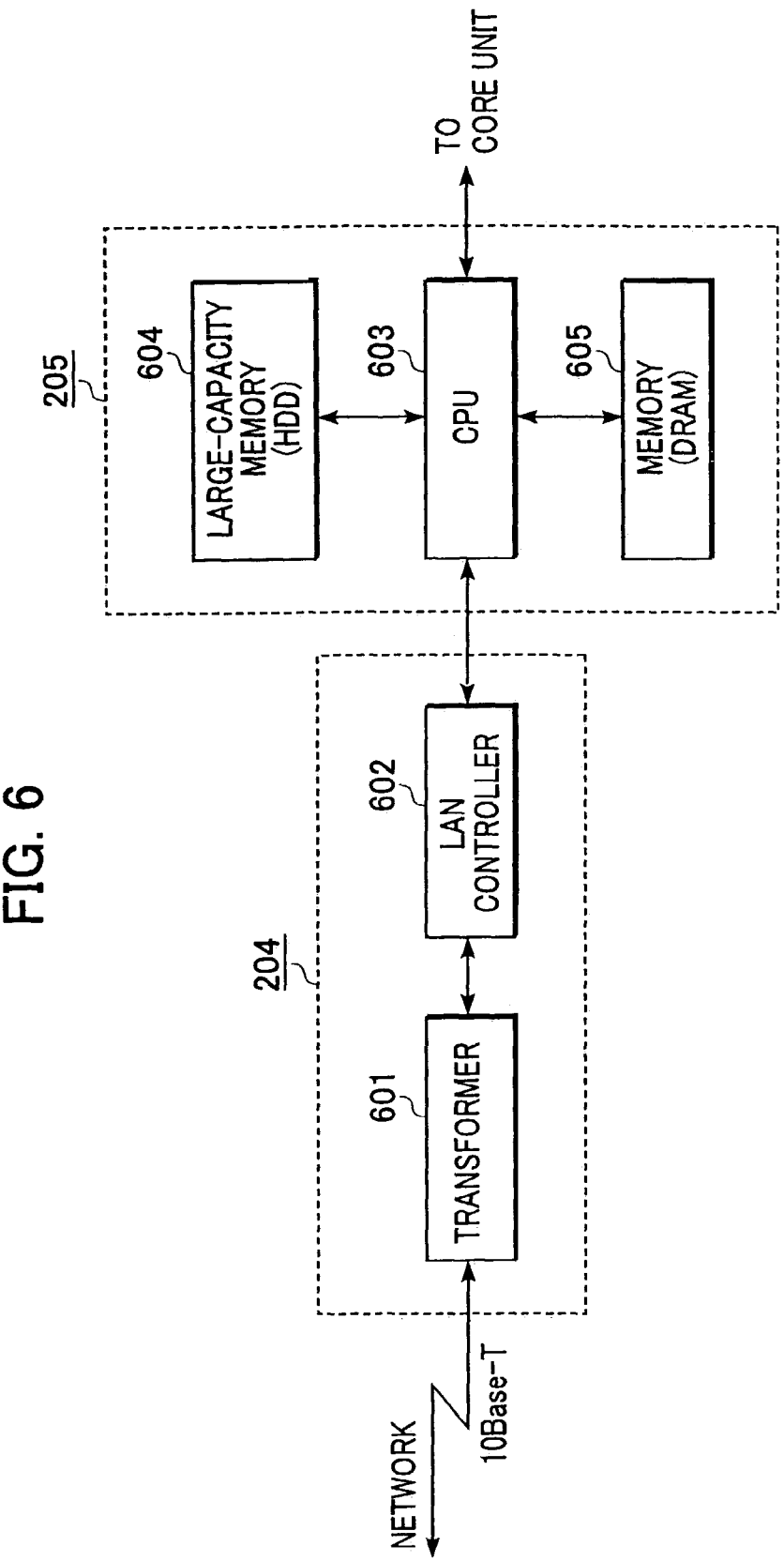
FIG. 6 is a block diagram illustrating an NIC/PDL unit of the image formation apparatus.

The NIC unit 204 will be described with reference to FIG. 6. The NIC unit 204 which serves as an interface to the network 101 functions to obtain external information using an Ethernet cable such as 10 Base-T/100 Base-TX or the like for example, and for providing information externally.

In the event of obtaining external information, the obtained data is first subjected to voltage conversion at a transformer unit 601, and sent to a LAN controller unit 602. The LAN controller unit 602 which has a first buffer memory (not shown) judges whether the data is necessary or not, and sends the data to a second buffer memory (not shown), following which the signals are sent to the PDL unit 205.

In the event of providing information externally, necessary information is added to the data sent from the PDL unit 205 at the LAN controller unit 602. The data is then sent onto the network 101 via the transformer unit 601.

[Configuration of PDL Unit 205]

The PDL unit 205 will be described with reference to FIG. 6. The image data created by an application software running on the client computer 103 is configured of text, shapes, photographs, etc., and more specifically, is made up of text code, shape code, and raster image data and the like, as a combination of image description components This is what is known as a PDL (Page Description Language), the most well-known being the PostScript language from Adobe Systems Incorporated.

The PDL unit 205 converts the PDL data into raster image data. First, the PDL data sent from the NIC unit 204 is temporarily stored in a large-capacity memory 604 such as a hard disk (HDD) or the like via the CPU unit 603, where each job is managed and saved. Next, the CPU unit 603 performs rasterizing image processing called RIP (Raster Image Processing) as necessary, to render the PDL data into a raster image. The rendered raster image data is stored in increments of color components CMYK for each page for each Job, in memory 605 which can be accessed at high speeds, such as DRAM or the like, and is sent to the core unit 206 via the CPU unit 603 according to the status of the printer unit 208.

[Configuration of Core Unit 206]

Figure 7:
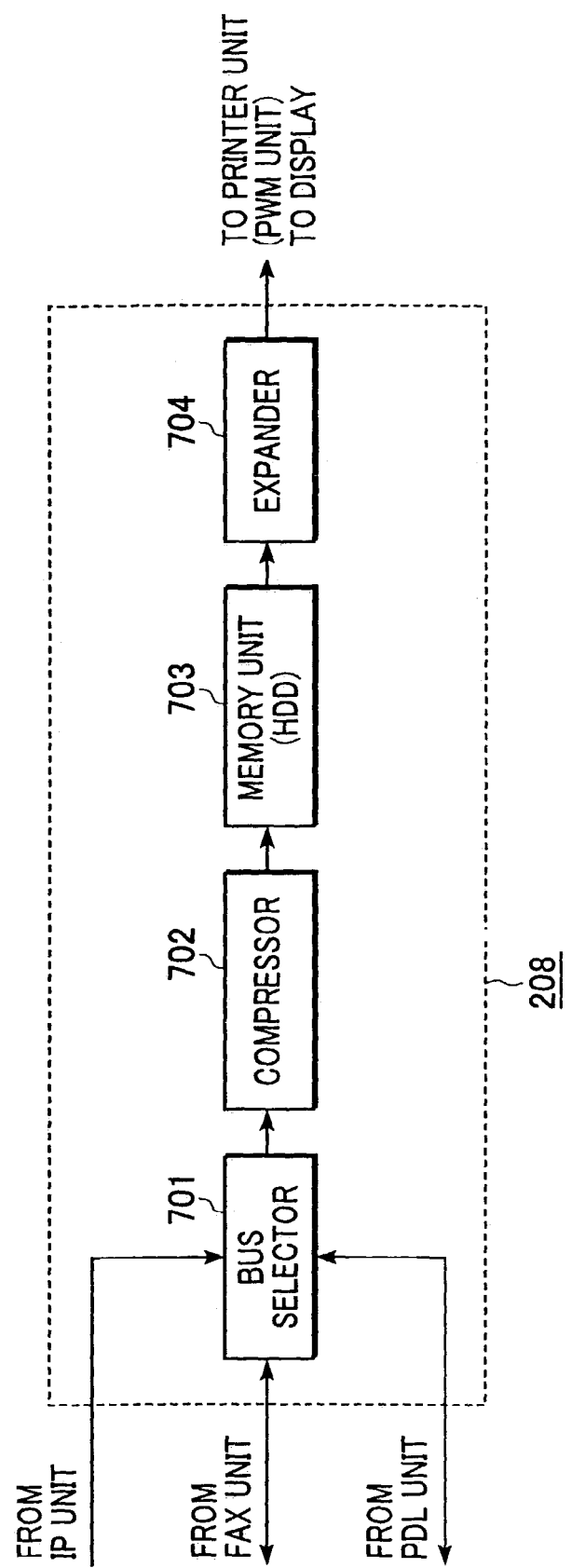
FIG. 7 is a block diagram illustrating a core unit of the image formation apparatus.

The core unit 206 will be described with reference to FIG. 7. A bus selector unit 701 of the core unit 206 serves to direct traffic for usage of the MFPs 104 and 105. In other words, the bus selector unit 701 switches the bus according to the functions of the MFPs 104 and 105, such as photocopying functions, network scanning, network printing, facsimile transmission/reception, display, etc.

The following is a list of switching patterns for the bus for executing the functions.

Photocopying functions: scanner unit 201→core unit 206→printer unit 208

Network scanning: scanner unit 201→core unit 206→NIC unit 204

Network printing: NIC unit 204→core unit 206→printer unit 208

Facsimile transmission functions: scanner unit 201→core unit 206→FAX unit 203

Facsimile reception functions: FAX unit 203→core unit 206→printer unit 208

Display functions: scanner unit 201 or FAX unit 203 or NIC unit 204→core unit 206→display unit 210

Next, The image data which has passed through the bus selector unit 701 is sent to the printer unit 208 (PWM unit 207) or display unit 210 via a compressing unit 702, memory unit 703 made up of a hard disk (HDD) or like large-capacity memory, and an expanding unit 704. Any commonly-used compression method may be used at the compressing unit 702, such as JPEG, JBIG, ZIP, and so forth. The compressed image data is managed in increments of jobs, and is stored along with attached data such as file name, creator, date and time of creating, file size, and so forth.

Further, providing a job No. and password and storing these together allows personal box functions to be supported. This is a function to allow data to be temporarily stored, and to prevent print-outs (reading out from the HDD) to be made by anyone other than a specified individual. In the event that a command is given to print out a stored job, the memory unit 703 is called up following verification by the password, the image is expanded and restored to a raster image, and sent to the printer unit 208. [Configuration of PWM unit 207]

Figure 8A:
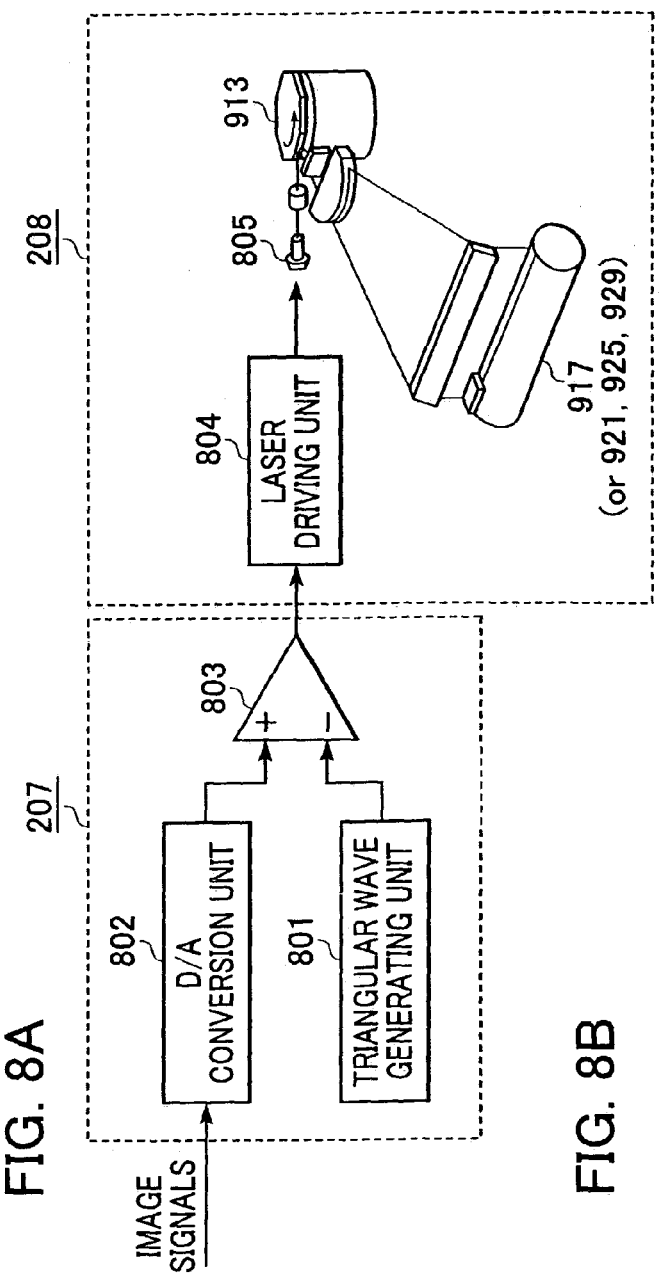
FIG. 8A is a block diagram illustrating a PWM unit of the image formation apparatus.
Figure 8B:
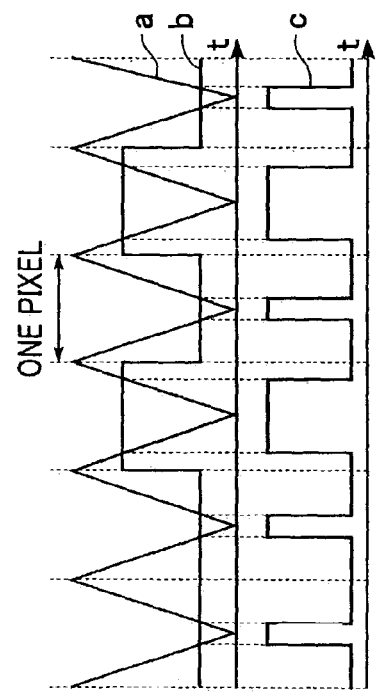
FIG. 8B depicts the waveforms generated in the PWM unit.

The PWM unit 207 will be described with reference to FIG. 8A. Image data that has been subjected to color separation, into the four colors of yellow (Y), magenta (M), cyan (C), and black (K) (monochrome in the case of the MFP 105), is sent from the core unit 206, and the four colors pass through respective PWM units 207 to be formed into images. Reference numeral 801 denotes a triangular wave generating unit, and 802 denotes a D/A converter (D/A converting unit) for converting digital image signals input thereto into analog signals. The signals from the triangular wave generating unit 801 (denoted by "a" in FIG. 8B), and the signals from the D/A converter 802 (denoted by "b" in FIG. 8B) are subjected to magnitude comparison at a comparator 803; and become signals, such as denoted by "c" in FIG. 8B, and are sent to a laser driving unit 804, where each of the C, M, Y, K, are converted into laser beams by respective laser devices 805.

The laser beams are each scanned with a polygonal scanner 913, and irradiated on respective photosensitive drums 917, 921, 925, and 929.

[Configuration of Printer Unit 208 (Case of MFP 104)]

Figure 9:
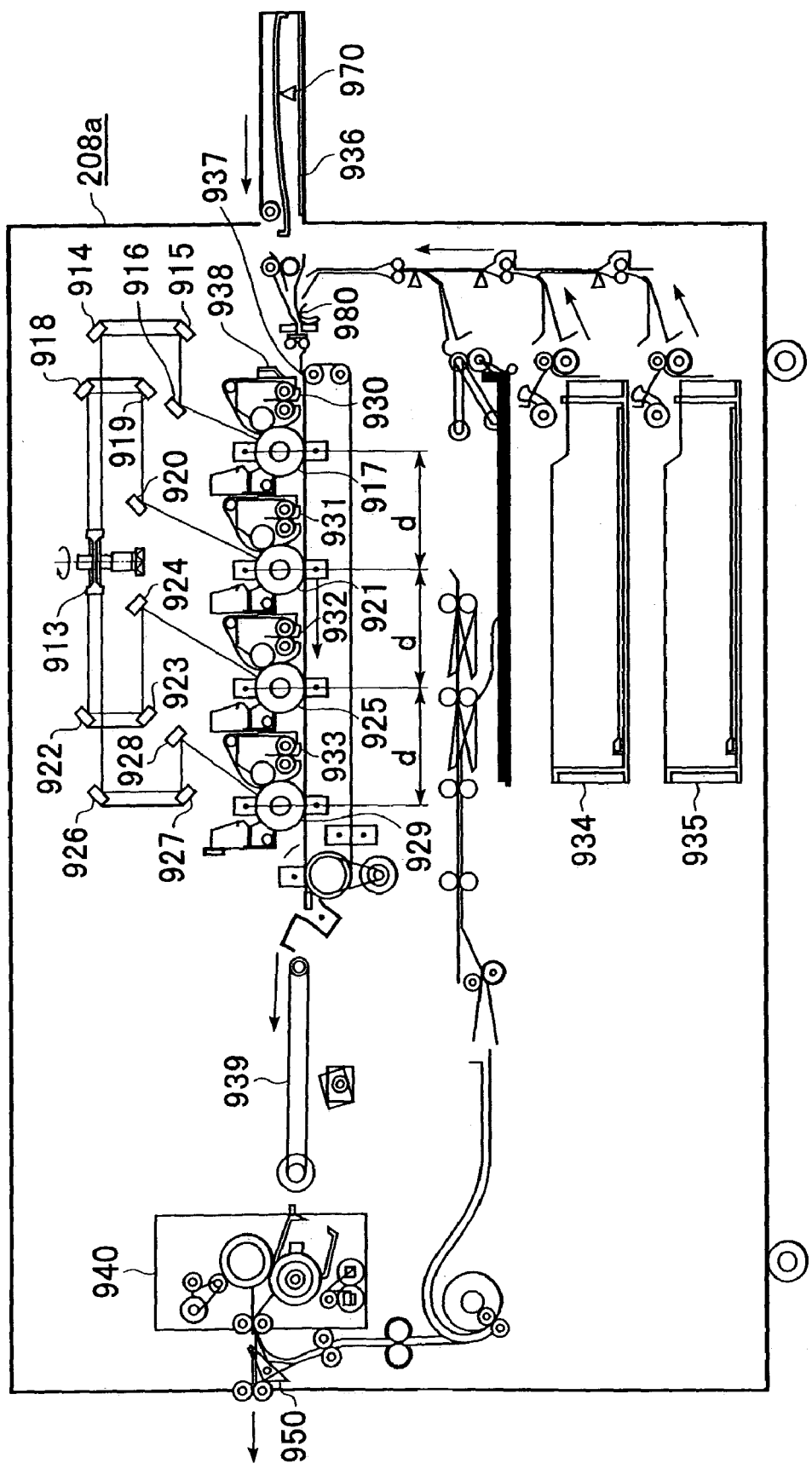
FIG. 9 is a diagram illustrating the printer unit of a color image formation apparatus.

FIG. 9 shows a schematic diagram of the printer unit 208a of the color MFP 104. Reference numeral 913 denotes a polygonal scanner, which receives the four laser beams emitted by the four semiconductor laser devices 805. Of these, one is reflected off of the mirrors 914, 915, and 916, and scans the photosensitive drum 917, the next one is reflected off of the mirrors 918, 919, and 920, and scans the photosensitive drum 921, the next one is reflected off of the mirrors 922, 923, and 924, and scans the photosensitive drum 925, and the next one is reflected off of the mirrors 926, 927, and 928, and scans the photosensitive drum 929.

On the other hand, reference numeral 930 denotes a developer for supplying yellow (Y) toner, which forms a yellow toner image on the photosensitive drum 917 according to the laser beam. Reference numeral 931 denotes a developer for supplying magenta (M) toner, which forms a magenta toner image on the photosensitive drum 921 according to the laser beam. Reference numeral 932 denotes a developer for supplying cyan (C) toner, which forms a cyan toner image on the photosensitive drum 925 according to the laser beam, and reference numeral 933 denotes a developer for supplying black (K) toner, which forms a black toner image on the photosensitive drum 929 according to the laser beam. Subsequently, toner images of the four colors Y, M, C, and K are transferred onto a sheet, thus yielding a full-color output image.

Sheets supplied from one of the sheet cassettes 934 or 935, or a hand feed tray 936, pass over a resist roller 937 and adhere to a transfer belt 938, and thus are transported. Sheets fed from the sheet cassette 934 or 935 and sheets fed from the hand feed tray 936 merge at a merging path 980. The hand feed tray 936 comprises a sheet detecting sensor 970 for detecting whether or not sheets have been loaded thereupon. Toner images of each color have been developed on the photosensitive drums 917, 921, 925, and 929, synchronously with the timing of feeding the sheet, and the toner is transferred onto the sheet as the sheet is transported. The sheet upon which toner of each color has been transferred is separated, transported by a transporting belt 939, and the toner is fixed on the sheet by a fixing unit 940. The sheet which has passed through the fixing unit 940 is temporarily guided downwards by a flapper 950, and following the trailing end thereof passing through the flapper 950, the sheet is switched back and discharged. The sheet is discharged in a face-down state, so the pages are in the proper order when printed from the beginning.

Note that the four photosensitive drums 917, 921, 925, and 929 are positioned at equal intervals of a distance "d". The sheet is transported at a constant speed "v" by the transporting belt 939, and the four semiconductor lasers 805 are driven by being synchronized according to the timing of the photosensitive drums thus spaced and the transporting speed.

[Configuration of Printer Unit 208 (Case of Black-And-White MFP 105)]

Figure 10:
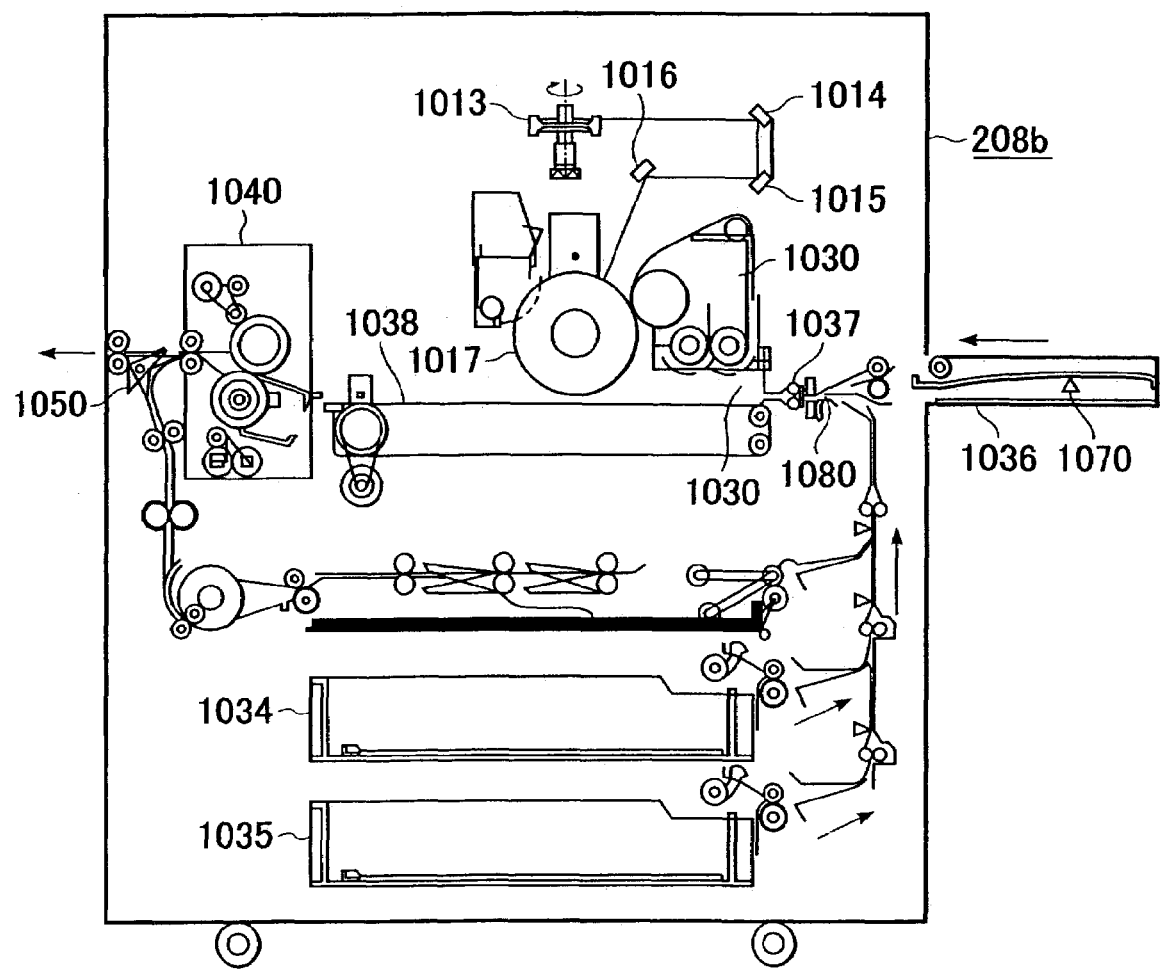
FIG. 10 is a diagram illustrating the printer unit of a black-and-white image formation apparatus.

FIG. 10 shows a schematic diagram of the printer unit 208b of the black-and-white MFP 105. Reference numeral 1013 denotes a polygon mirror, which receives laser beams emitted by the semiconductor laser device 805. The laser beams are reflected off of the mirrors 1014, 1015, and 1016, and scan a photosensitive drum 1017. On the other hand, reference numeral 1030 denotes a developer for supplying black toner, which forms a black toner image on the photosensitive drum 1017 according to the laser beams. The toner image is then transferred onto a sheet, thus yielding an output image.

Sheets supplied from one of the sheet cassettes 1034 or 1035, or the hand feed tray 1036, pass over a resist roller 1037 and adhere to a transfer belt 1038, and thus are transported. Sheets fed from the sheet cassette 1034 or 1035 and sheets fed from the hand feed tray 1036 merge at a merging path 1080. The hand feed tray 1036 comprises a sheet detecting sensor 1070 for detecting whether or not sheets have been loaded thereupon. A toner image has been developed on the photosensitive drum 1017, synchronously with the timing of feeding the sheet, and the toner is transferred onto the sheet as the sheet is transported. The sheet upon which toner has been transferred is separated, and the toner is fixed on the sheet by a fixing unit 1040. The sheet which has passed through the fixing unit 1040 is temporarily guided downwards by a flapper 1050, and following the trailing end thereof passing through the flapper 1050, the sheet is switched back and discharged. The sheet is discharged in a face-down state, so the pages are in the proper order when printed from the beginning.

[Configuration of Display Unit 210]

Figure 11:
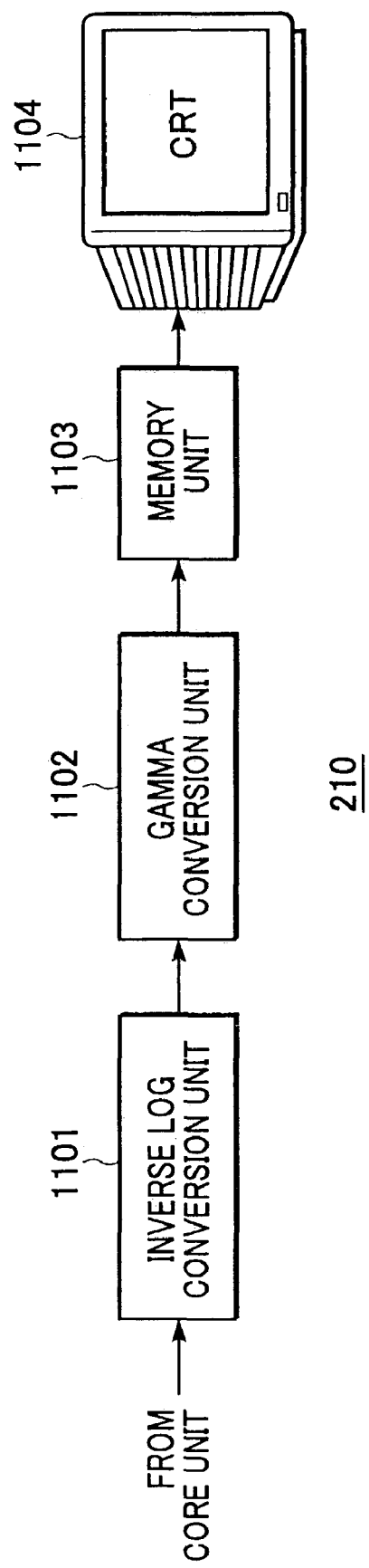
FIG. 11 is a block diagram illustrating a display unit of the image formation apparatus.

FIG. 11 shows the display unit 210. Image data output from the core unit 206 is CMYK data, and accordingly must be converted into RGB data at an inverse LOG conversion unit 1101. Next, output conversion using a lookup table is performed at a gamma converting unit 1102 in order to match the color properties of a display device 1104, which is a CRT or the like to which output is to be made. The converted image data is temporarily stored in the memory unit 1103, and is displayed by the display device 1104 such as a CRT or the like.

The display unit 210 is used for preview functions for confirming output images beforehand, proofing functions for verifying whether an image to be output is what the operator intended, and preventing waste of printing sheets in the event that confirming images regarding which printing is unnecessary.

[Configuration of Finisher Unit 209]

Figure 12:
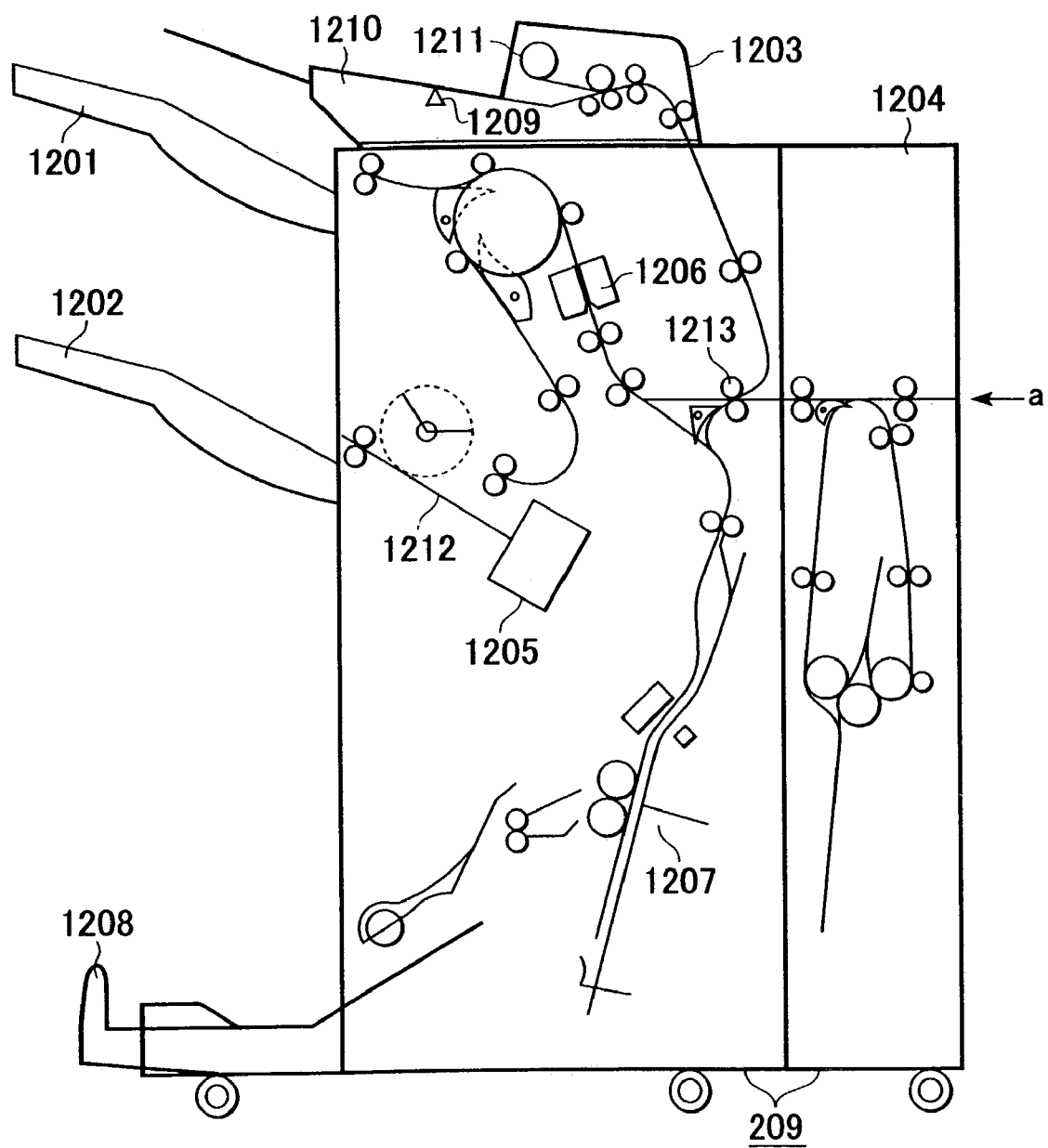
FIG. 12 is a diagram illustrating a finisher unit of the image formation apparatus.

FIG. 12 is a schematic diagram of the finisher unit 209. Sheets exiting from the fixing unit 940 or 1040 of the printer unit 208 enter the finisher unit 209. The finisher unit 209 includes a sample tray 1201 and a stack tray 1202. Discharge of sheets is switched between these according to the type of job and the number of sheets to be discharge.

There are two types of sorting, one being bin sorting where multiple bins are provided and the sheets are sorted into the bins, and shift sorting which involves later-described electronic sorting functions with bins (or trays) being shifted back and forth so as to sort the output sheets by job. The electronic sorting function is called a collator, and in the event that the apparatus is provided with the large-capacity memory described earlier with reference to the core unit, electronic sorting functions can be supported by using this memory and changing the order of pages or the discharge order thereof of the pages buffered therein so as to realize collating functions. Next, group functions are functions for sorting by page, whereas the sorting functions sort by job.

Further, in the event of discharging to the stack tray 1202, sheets before being discharged can be accumulated on an intermediate tray 1212 by job, and bound by a stapler 1205 immediately before being discharged Moreover, a Z-folder 1204 for Z-folding sheets and a puncher 1206 for punching two (or three) holes for filing are disposed on the way to the above two trays, and execute their respective processing according to the type of job.

Further, a saddle stitcher 1207 binds two positions at the center of the sheets, then nips the center portion of the sheets with a roller so as to fold the sheets in half, and makes booklets like magazines or pamphlets. The sheets bound by the saddle stitcher 1207 are discharged onto a booklet tray 1208.

Further yet, while not shown in the drawings, functions such as binding by gluing, or trimming the side opposite to the bound side for alignment after binding, etc., may be added as well.

Also, an inserter 1203 is used for sending sheets set on the tray 1210 to one of the trays 1201, 1202, and 1208, without passing through the printer. Sheets supplied from the inserter 1203, and the sheets sent to the finisher 209 (sheets transported in the direction indicated by the arrow "a" in FIG. 12) merge at the merging path 1213. Thus, sheets set in the inserter 1203 can be inserted between the sheets sent to the finisher 209. A sheet detecting sensor 1209 for detecting whether or not sheets are loaded is provided to the tray 1210 of the inserter 1203, and with sheets set on the tray 1210 by the user in a fact-up state, sheets are fed by a pick-up roller 1211 in order from the topmost sheet. Accordingly, the sheets from the inserter 1203 are transported to the trays 1201 and 1202 as they are, and discharged in a face-down state. In the event of sending the sheets to the saddle stitcher 1207, the sheets are first sent toward the puncher 1206 and then switched back so as to match the faces.

[Configuration of Collator 106]

Figure 13:
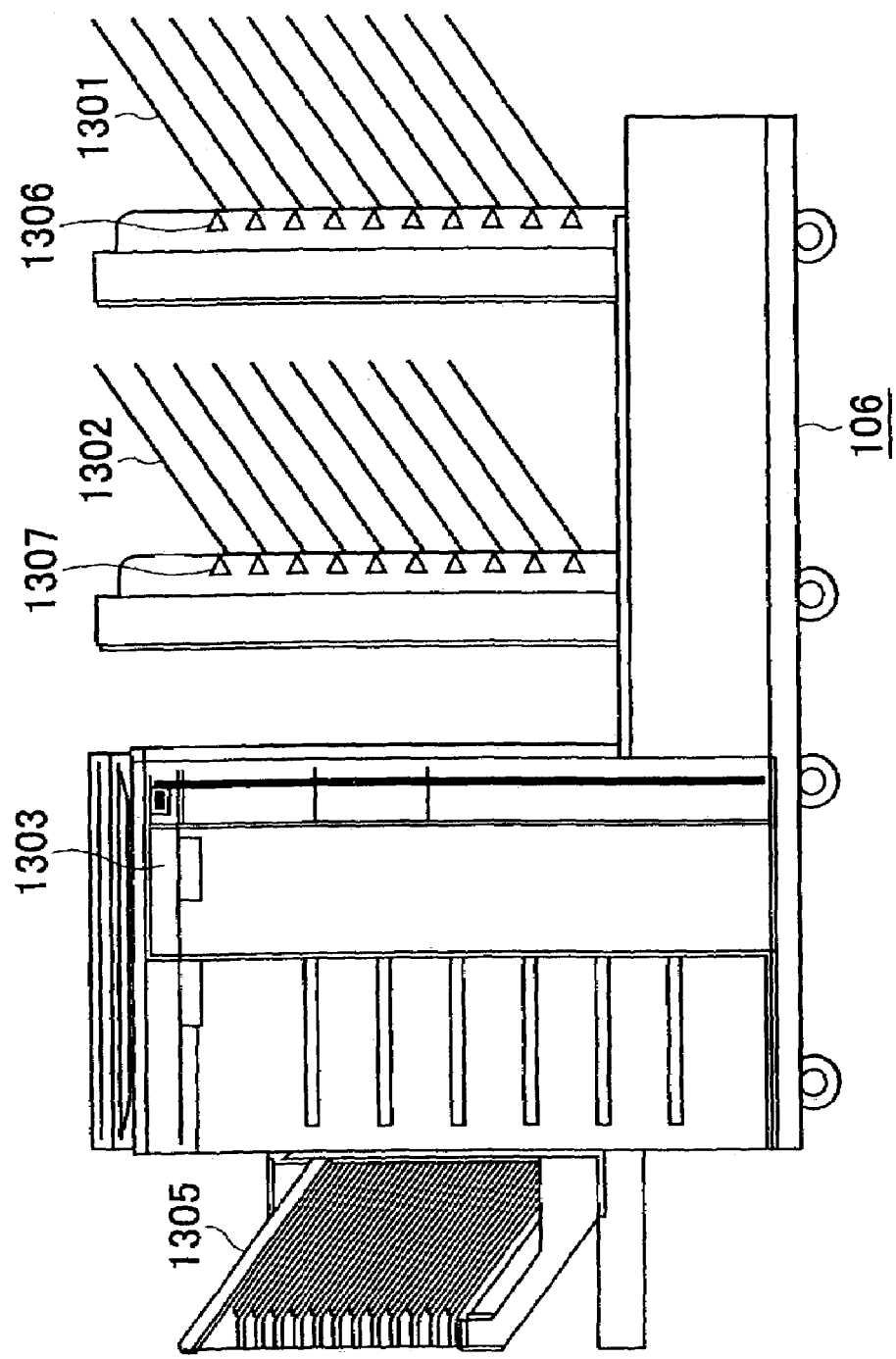
FIG. 13 is a schematic drawing of a collator.

FIG. 13 shows a schematic diagram of the collator 106. The collator 106 is made up of input bin units 1301 and 1302 for setting sheet bundles discharged from the color MFP 104 and black-and-white MFP 105, a finishing unit 1303 for subjecting the sheets sent from the input bin units 1301 and 1302 to finishing processing, and a sorting bin unit 1305 for sorting the collated sheet bundles by job. The input bin units 1301 and 1302 have respective sheet detecting sensors 1306 and 1307 for detecting whether sheets have been loaded thereupon.

Figure 14:
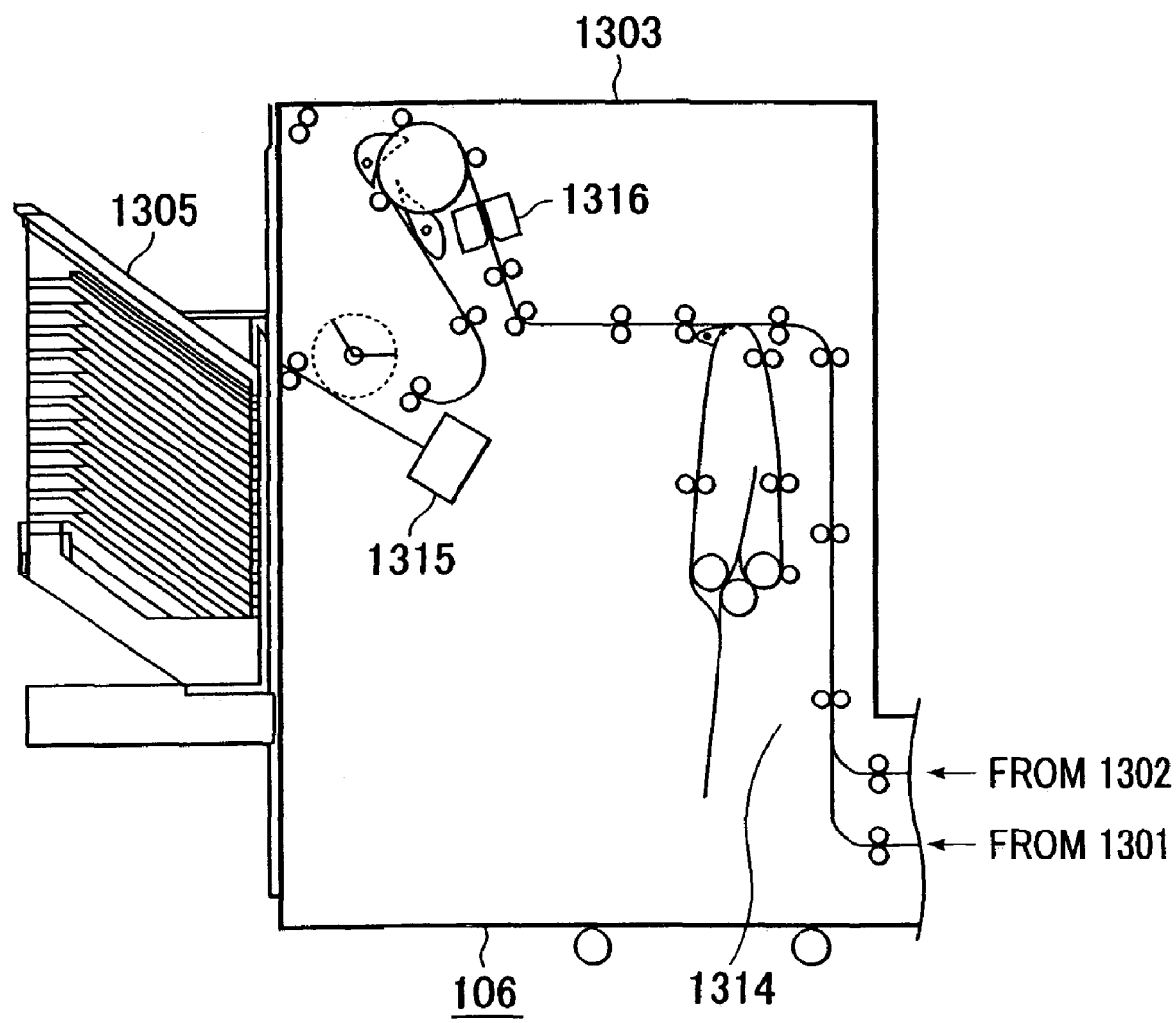
FIG. 14 is a diagram illustrating a finisher unit of the collator.

FIG. 14 is a diagram illustrating the finishing unit 1303. At the finishing unit 1303, sheets can be accumulated by job before discharging to the sorting bin 1305, and bound by a stapler 1315 immediately before discharging.

Also, a Z-folder 1314 for Z-folding sheets and a puncher 1316 for punching two (or three) holes for filing are provided, and execute their respective processing according to the type of job.

Further yet, while not shown in the drawings, functions such as binding by gluing, or trimming the side opposite to the bound side for alignment after binding, etc., may be added as well.

[Driver window]

Figure 15:
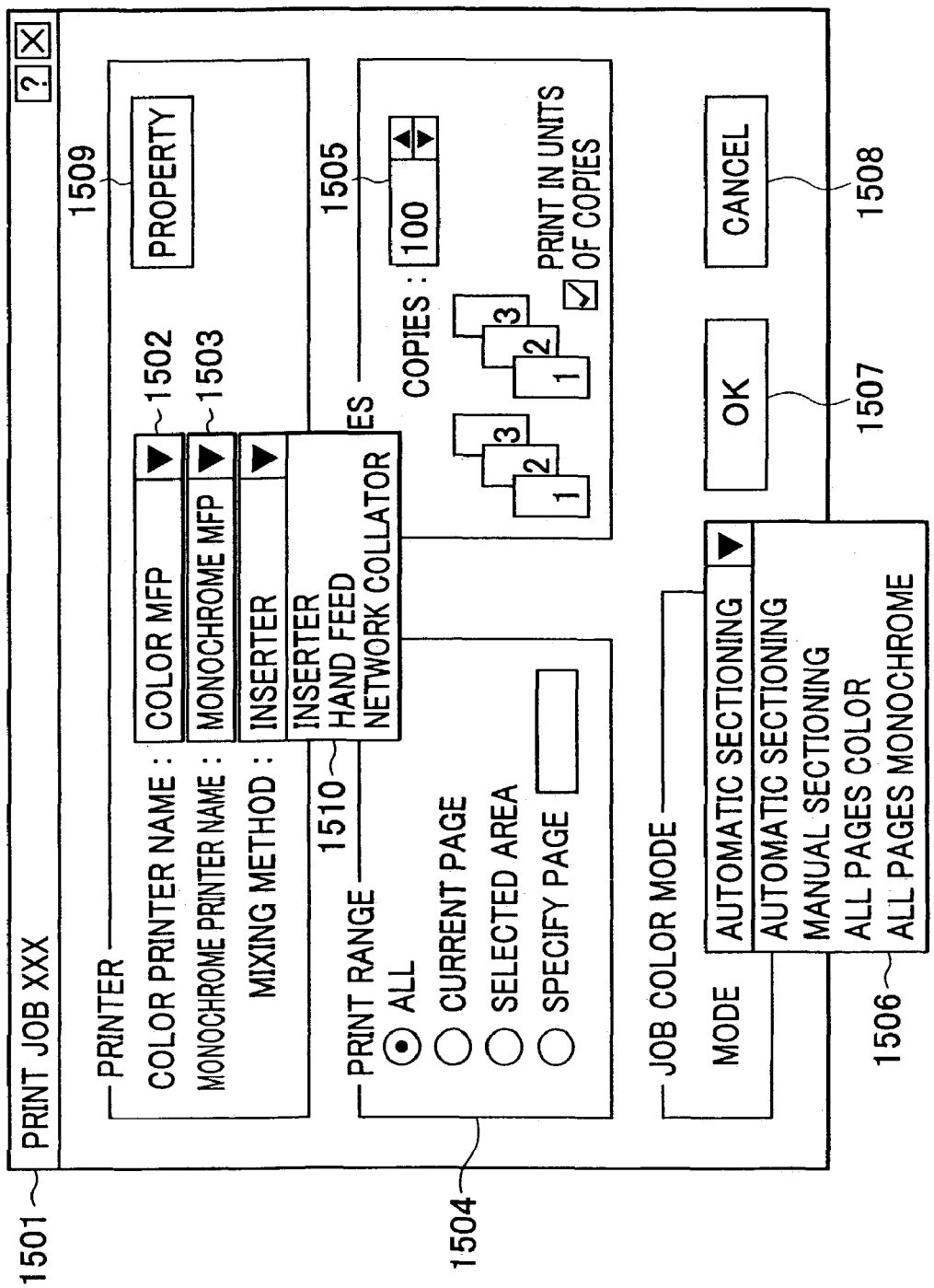
FIG. 15 is a diagram illustrating a screen example of a printer driver.

Next, description will be given regarding a driver window screen. In the event of printing a job where a color page and black-and-white page both exist within a single job from the client computer 103 and server computer 102, a driver program, which is software installed in and running on the server computer 102 and/or client computer 103, having a display screen such as shown in FIG. 15, initially transfers the job to the color MFP 104. Here, reference numeral 1501 denotes the driver window displayed on the screens of the computers 102 and 103, and for items to be set therein. Reference numeral 1502 denotes a color printer selection column for selecting a color printer (color MFP 104). Reference numeral 1503 denotes a black-and-white printer selection column for selecting a black-and-white printer (black-and-white MFP 105). Reference numeral 1504 denotes a page setting column for selecting output pages from the job. Reference numeral 1505 denotes a number-of-copies setting column for specifying the number of copies to be made. Reference numeral 1506 denotes a job color mode column for instructing sectioning of color/black-and-white images with regard to a job containing both color and black-and-white images. Reference numeral 1507 denotes an OK key for starting printing. Reference numeral 1508 denotes a cancel key for canceling the printing, and reference numeral 1509 denotes a properties key for further detailed settings.

Reference numeral 1510 denotes a pop-up menu for selecting the method of mixing the sheets printed at the color printer and the sheets printed at the black-and-white printer following sectioning thereof, with one of the finisher inserter, hand feed tray, and network collator being selected here. The process of taking sheets that have been separately printed for color and monochrome and putting the sheets back into the original order will be referred to as mixing.

The job color mode column 1506 allows selection of one mode from automatic sectioning, manual sectioning, all pages color, and all pages monochrome. Automatic sectioning is a mode wherein the user does not specify which of the color printer and black-and-white printer will be used to print, and the decision is automatically made. On the other hand, manual sectioning is a mode that the user decides which of the color printer and black-and-white printer will be used to print by selecting which pages will be output from which MFP. All pages color is a mode wherein all pages are printed with the color printer, and all pages monochrome is a mode where all pages are printed with the black-and-white printer. Also, in the event that all pages monochrome or all pages color is selected at the job color mode column 1506, there is need for mixing, so selection of the mixing method in 1510 is disabled.

[Description of the Network Utility Software]

Description will now be made regarding the utility software running on the client computer 103 and server computer 102. A standardized database called a MIB (Management Information Base) is configured in the network interface unit (a combination of the NIC unit 204 and the PDL unit 205) in the MFPs 104 and 105, so as to communicate with computers on the network using a network management protocol called SNMP (Simple Network Management Protocol), thereby managing MFPs 104 and 105, and also other devices connected to the network, such as scanners, printers, facsimiles, and so forth.

On the other hand, software programs called utilities run on the client computer 103 and server computer 102, so as to exchange necessary information using the MIB by SNMP over the network.

The user can confirm information regarding the MFPs 104 and 105 connected to the network on the client computer 103 and server computer 102 by using the MIB, such as detecting whether or not the finisher 209 is connected to the MFPs 104 and 105 as equipment information thereof, detecting whether or not printing is currently available as status information, entering or changing or confirming the names and installation locations and the like of the MFPs 104 and 105, and so forth. Also, such information can be provided with read-write restrictions which are different between the server computer 102 and the client computer 103.

Accordingly, using these functions allows the user to obtain various types of information, such as equipment information for the MFPs 104 and 105, apparatus status, network settings, job history, management of the usage state, control, and so forth, at the client computer 103 and server computer 102.

[Description of GUI]

Figure 16:
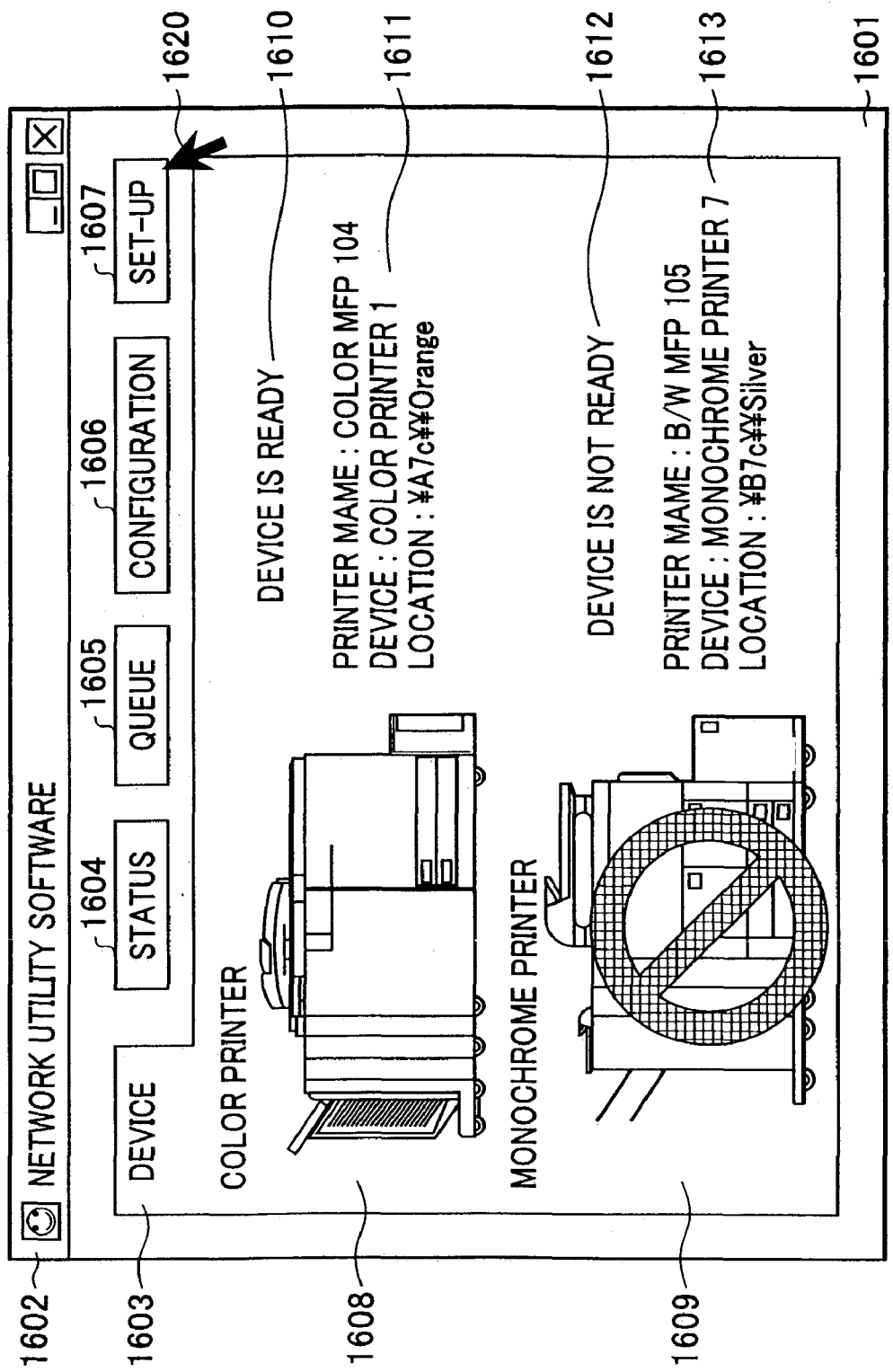
FIG. 16 is a diagram illustrating a screen example of utility software.

The screen of the utility software called GUI (Graphic User Interface) running on the client computer 103 and server computer 102 will be described with reference to FIG. 16. Upon activating the utility software on the client computer 103 and server computer 102, a screen such as that shown in FIG. 16 appears. Here, reference numeral 1601 denotes a window, and 1620 denotes a cursor, where clicking with a mouse causes changes such as opening other windows or making transition to a subsequent state.

Reference numeral 1602 denotes what is called a title bar, used for displaying the hierarchical level and title of the current window. Reference numerals 1603 through 1607 denote so-called tabs, which are classified and used for viewing information or selecting information.

Also, reference numeral 1603 denotes what is called a device tab, allowing the user to know the existence of a device and the overview thereof. The device tab contains bitmap images indicating the MFP 104 and MFP 105 as indicated by 1608 and 1609, and messages 1610, 1611, 1612, and 1613 indicating the status of the MFPs. Detailed status of the apparatuses can be found by viewing the status tab 1604. Reference numeral 1605 denotes a queue tab, which allows the user to know the jobs queued in each apparatus and the traffic situation thereof.

The configuration tab 1606 allows the user to know equipment information, such as whether finishers are installed, and what sort of functions the finishers have. For example, the MFP 105 has a finisher with functions of a stapler, saddle stitcher, folder, puncher, an inserter. Further, the user can find information that a letter size paper deck capable of holding 5000 sheets is installed, how many sheets are remaining therein, and that a unit for processing both faces is also installed, and so forth. The setup tab 1607 allows the user to know network settings information for the apparatuses.

[Control at the Server Computer]

Next, control of the server computer 102 will be described with reference to FIG. 17. The program for executing this flowchart is stored in the hard disk of he server computer 102, and is executed by the CPU of the server computer 102. Upon the OK key 1507 being pressed in the driver window 1501, the driver running on the client computer 103 judges via the server computer 102 whether or not the sectioning method set in the job color mode column 1506 in the driver window 1501 is automatic sectioning (Step 1700). In the event that the sectioning method is automatic sectioning, a message to that effect is transmitted to the color MFP 104 (Step 1701).

Subsequently, the setting contents for the sampling cycle used at the time of determining whether a page is color or monochrome is transmitted to the color MFP 104 (Step 1702). However, setting of the sampling cycle has been performed beforehand at a window for detailed settings, displayed by pressing the property key 1509. The sampling cycle is used for high-speed color/monochrome determining, and is used for reading in colors from pixels at predetermined intervals. For example, in the event that 1 point per 100 pixels by 100 lines is sampled, the sampling time can be reduced to 1/10,000. Also, with an example of determining an image of 400 dpi, sampling with a 0.25-inch (i.e., 6.35 mm) pitch grid gives close to 1,500 points on a letter size (11" by 8.5") sheet. Accordingly, it can be fairly well determined whether a page is color or monochrome. In the event that the determination is still difficult, the sampling cycle can be set to a finer pitch, or the job color mode column 1506 can be set to manual sectioning so that whether each page is color or monochrome, it can be set in the detailed settings window beforehand.

Next, the job contents are transmitted. At this point, it has not yet been determined which pages are black-and-white pages, so the job contents for all pages are transmitted to both the color MFP 104 and the black-and-white MFP 105 respectively (Step 1703). That is, the same data (the job contents for all pages) is sent to both the color MFP 104 and the black-and-white MFP 105. The color pages and black-and-white pages are may be transmitted in the order of the color MFP and the black-and-white MFP with a time-wise offset therebetween, or may be sent to both MFPs at the same time.

In the event that the judgment made in Step 1700 is that the mode is not automatic sectioning, whether or not the mode is manual sectioning is judged in Step 1704. In the event that the job is set to the manual sectioning mode, a message is transmitted to the color MFP 104 to that effect (Step 1705). The image data of the pages set so as to be printed by the color MFP 104 is transmitted to the color MFP 104, and the image data of the pages set so as to be printed by the black-and-white MFP 105 is transmitted to the black-and-white MFP 105 (Step 1706).

In the event that the judgment made in Step 1704 is that the mode is not manual sectioning, whether or not the mode is all color printing is judged in Step 1707. In the event of printing all pages in color, a message is transmitted to the color MFP 104 to that effect (Step 1708), and the job contents for all pages are transmitted to the color MFP 104 (Step 1709). In the event that the judgment made in Step 1707 is that the mode is not all color printing, this means printing all pages in monochrome, so a message is transmitted to the color MFP 104 to that effect (Step 1710), and the job contents for all pages are transmitted to the black-and-white MFP 105 (Step 1711).

Following transmission of the job contents in Steps 1703 or 1706, a judgment is made regarding which mixing method (inserter, hand feed tray, collator, or the like) to use. First, a judgment is made whether to use the inserter for mixing (Step 1712). In the event of using the inserter for mixing, a message is transmitted to the color MFP 104 and the black-and-white MFP 105 to that effect (Step 1713).

In the event that the judgment is not made to use the inserter for mixing in Step 1712, a judgment is made regarding whether to use the collator for mixing (Step 1714). In the event of using the collator for mixing, a message is transmitted to the color MFP 104 and the black-and-white MFP 105 to that effect (Step 1715).

In the event that the judgment is not made to use the collator for mixing in Step 1714, a judgment is made regarding whether to use the hand feed tray for mixing (Step 1716). In the event of using the hand feed tray for mixing, a message is transmitted to the color MFP 104 and the black-and-white MFP 105 to that effect (Step 1717).

Following transmission of the job contents to the color MFP or the black-and-white MFP in Steps 1709 or 1711, in the event that the judgment is not made in Step 1716 to perform mixing using the hand feed tray or after completion of transmission of the mixing method in Steps 1713, 1715, or 1717, the processing at the server computer 102 ends.

[Control at the Color MFP]

Figure 18:
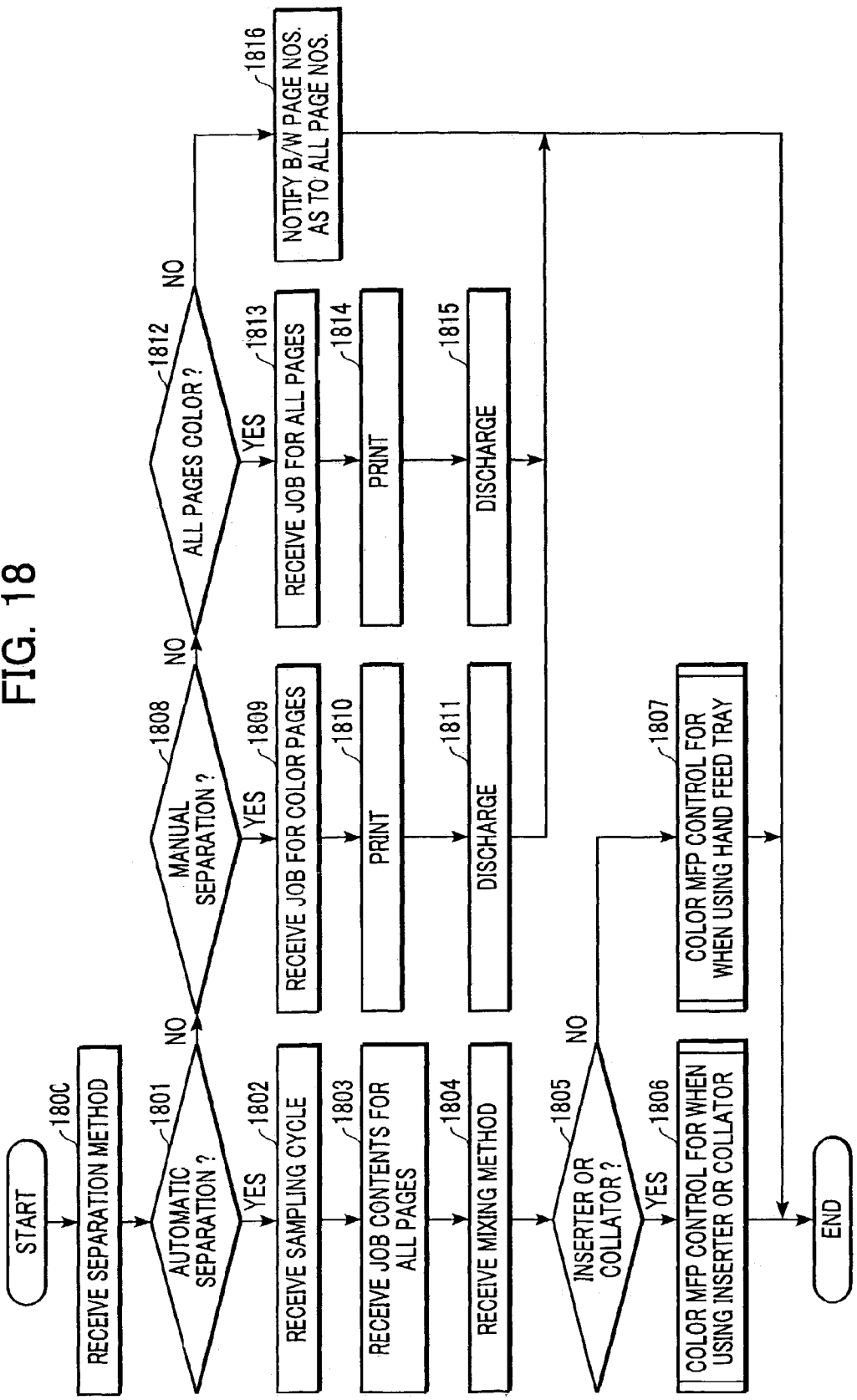
FIG. 18 is a flowchart illustrating control of a color MFP.

Next, control at the color MFP 104 side will be described with reference to FIG. 18. The program for executing this flowchart is stored in the color MFP 104, and is executed by a CPU 603 of the color MFP 104.

Figure 17:
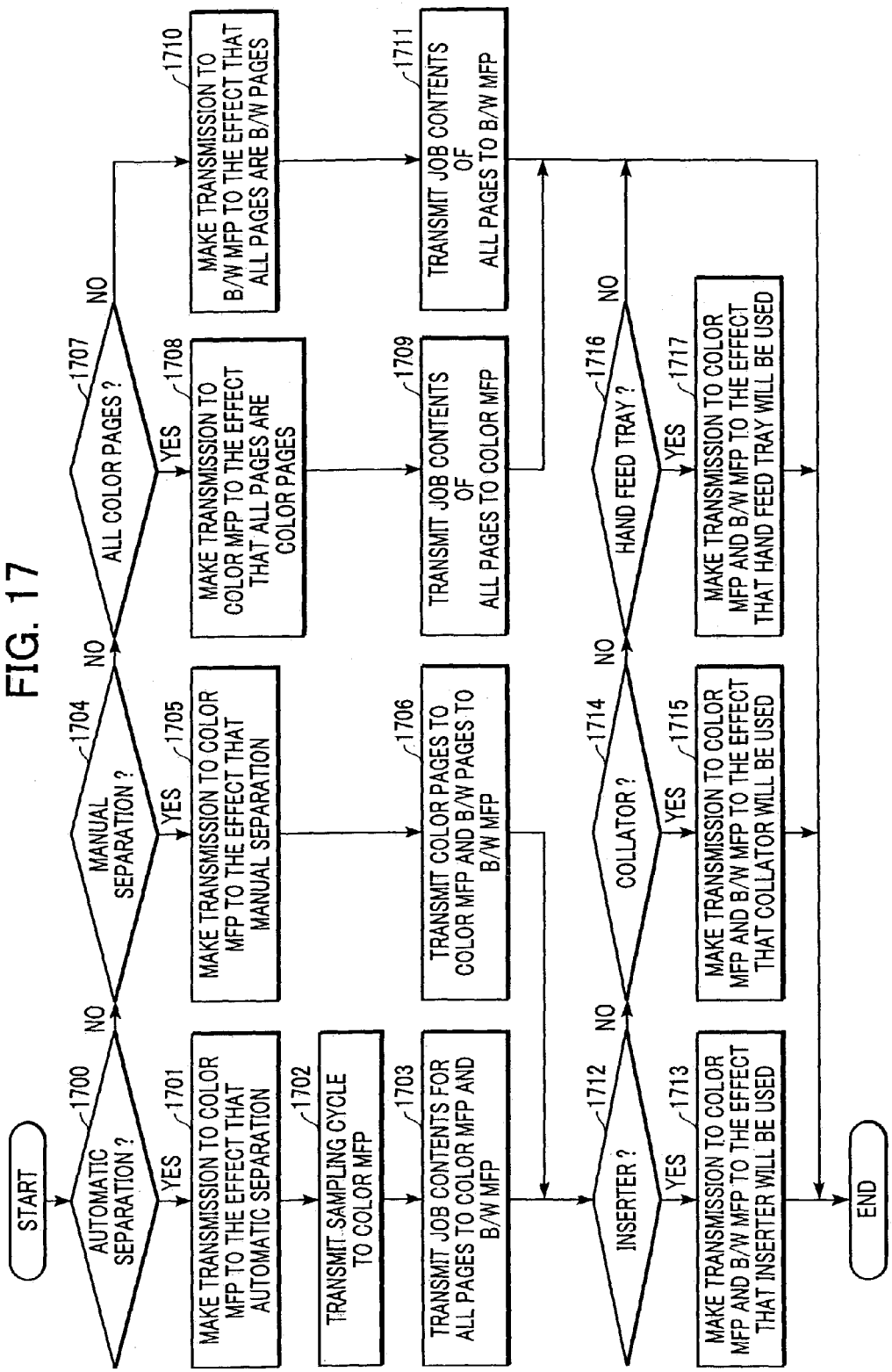
FIG. 17 is a flowchart illustrating control of a server computer.

First, the sectioning method (automatic sectioning, manual sectioning, all pages color, or all pages monochrome) transmitted from the server computer 102 in Steps 1701, 1705, 1708, or 1710, in FIG. 17, is received (Step 1800).

Next, a judgment is made regarding whether or not the sectioning method received in Step 1800 is automatic sectioning (Step 1801). In the event that the sectioning method is automatic sectioning, the sampling cycle transmitted from the server computer 102 in Step 1702 is received (Step 1802), and the job contents for all pages transmitted from the server computer 102 in Step 1703 are received (Step 1803). Next, information transmitted from the server computer 102 in Steps 1713, 1715, or 1717, regarding which mixing method to use (inserter, collator, or hand feed tray) is received (Step 1804). A judgment is made whether to use the inserter or collator for mixing, based on the information regarding which mixing method to use that has been received in Step 1804 (Step 1805). In the event that the judgment is made to use the inserter or collator, the flow proceeds to the later-described control of the color MFP for using the inserter or collator. In the event that the judgment is not made to use the inserter or collator in Step 1805, the flow proceeds to the later-described control of the color MFP for using the hand feed tray.

In the event that the judgment that the mode is automatic sectioning is not made in Step 1801, whether or not the mode is manual sectioning is judged in Step 1808. In the event that the job is set to the manual sectioning mode, the job of the color pages transmitted in Step 1706 is received (Step 1809), and the color pages are printed by the color MFP 104 (Step 1810) and discharged (Step 1811).

In the event that the judgment that the mode is manual sectioning is not made in Step 1808, whether or not to print all pages at the color MFP 104 is judged in Step 1812. In the event of judging printing all pages in color, the job for all pages transmitted in Step 1709 is received (Step 1813), and all pages are printed by the color MFP 104 (Step 1814) and discharged (Step 1815).

In the event that the judgment that the mode is all color printing is not made in Step 1812, this means printing all pages at the black-and-white MFP 105, so the black-and-white page numbers for all page numbers are notified to the black-and-white MFP 105 on the network.

Following color MFP control for each mixing method in Steps 1806 and 1807, or sheet discharging in Steps 1811 and 1815, or notification of black-and-white page numbers in Step 1816, the control at the color MFP ends.

[Color MFP Control in the Event of Using Inserter or Collator]

Figure 19:
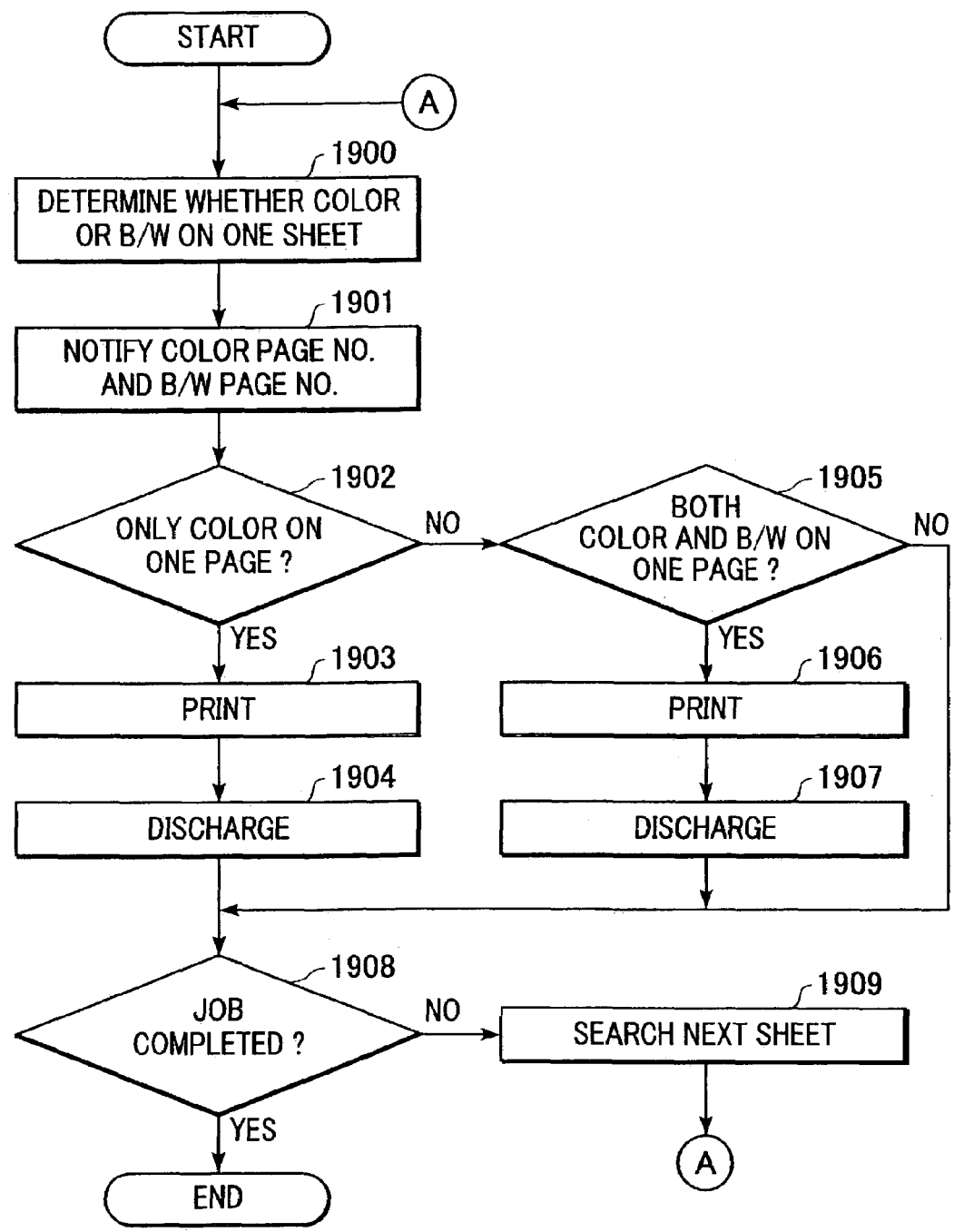
FIG. 19 is a flowchart illustrating control of a color MFP when using an inserter or collator.

FIG. 19 is a detailed flowchart of Step 1806 (color MFP control in the event of using an inserter or collator). First, the PDL unit 205 of the color MFP 104 sequentially performs raster image processing (RIP) from the first page in the job received in Step 1803, and following RIP stores the dolor components (cyan (C), magenta (M), Yellow (Y), and black (K)) in the semiconductor memory 605 for each page. The stored image is subjected to color/monochrome determining by the CPU 603, one page at a time, to be formed on one sheet (Step 1900). The determination uses the sampling cycle received in Step 1802, and is based on whether there is a component other than the black (K) component, i.e., any of the C, M, or Y, components, at each sampling point in the semiconductor memory 605. At this time, in order to increase speed, the color/monochrome determining for the page is cancelled whenever even a single color (CMY) component point is found in the sampling points, since this means that the page is a color image, and the page is processed in the color MFP 104 as a color page. In the event that there is not even a single color (CMY) component point in the sampling points in the page, the page is processed at the black-and-white MFP 105 as a black-and-white page. In the event that the determination results of Step 1900 indicate a color page, information indicating that the page, with that page number is a color page, is transmitted to the black-and-white MFP 105, and in the event that the determination results of Step 1900 indicate a black-and-white page, information indicating that the page with that page number is a black-and-white page is transmitted to the black-and-white MFP 105 (Step 1901). Note, however, in the event that mixing is to be performed using the collator, the color page numbers and the black-and-white page numbers are transmitted to the collator as well.

Subsequently, a judgment is made regarding whether or not only color pages are to be formed on one sheet (Step 1902). In the event that a judgment is made that only color pages are to be formed on one sheet, the printing is performed by the color MFP 104 (Step 1903), and the sheet is discharged (Step 1904).

In the event that the judgment is not made that only color pages are to be formed on one sheet in Step 1902, a judgment is made regarding whether or not both color pages and black-and-white pages are to be formed on the sheet (Step 1905). In the event that a judgment is made that both color pages and black-and-white pages are to be formed on the sheet, all pages are printed by the color MFP 104 (Step 1906). For example, in the event that one side of a sheet on which images are formed on both sides is a black-and-white image and the other side is a color image, or in the event both color pages and black-and-white pages are to be formed on a sheet for saddle stitch binding, or in the event that multiple pages are to be reduced and formed on a single sheet for a reduced layout and both color pages and black-and-white pages exist on the sheet, the color MFP 104 prints all of the pages even in the event that there are some black-and-white pages therein. This is because insertion and mixing occur following the sheet passing through the printer unit 208 in the event of using an inserter or collator, so other images cannot be formed on another side of a sheet to be inserted. Subsequently, the sheet printed by the color MFP 104 is discharged (Step 1907).

Following discharging of the sheet printed by the color MFP 104 in Steps 1904 or 1907, or in the event that a judgment is not made in Step 1905 that both color pages and black-and-white pages are to be formed on one sheet, a judgment is made regarding whether or not all images to be formed with the color MFP 104 have been formed, i.e., whether the job has ended (Step 1908).

In the event that the job has not ended, pages to be formed on the following sheet are searched (Step 1909), and the flow returns to the color/monochrome determination in Step 1900. Steps 1900 through 1907 are repeated to the last page unless there is a job cancellation interruption, and the job at the MFP 104 ends.

Also, while the above description has been made with regard to an arrangement wherein rasterizing is performed in page-sequence, an arrangement may also be made where the entire job is first rendered by RIP in a large-capacity memory 604, with each page or multiple pages being read out in sequence to the semiconductor memory 605 for determination processing.

[Color MFP Control in the Event of Using Hand Feed Tray]

Figure 20:
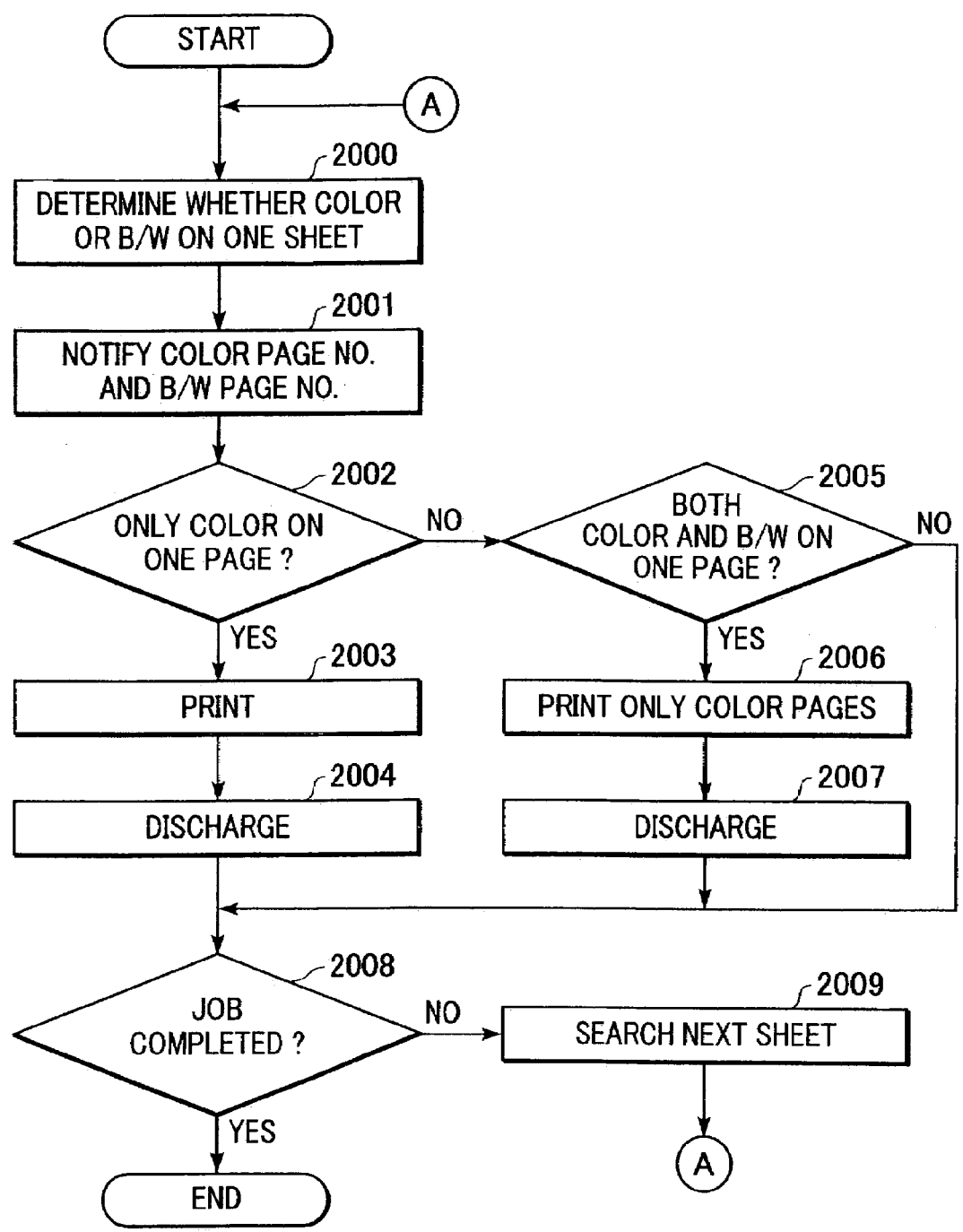
FIG. 20 is a flowchart illustrating control of a color MFP when using a hand feed tray.

FIG. 20 is a detailed flowchart relating to Step 1807 (color MFP control in the event of using the hand feed tray). In the event of using the hand feed tray, the sheets are inserted and mixed before passing through the printer unit 208*a* of the black-and-white MFP 105, so images can be formed on the other face of pages to be inserted. With regard to a sheet which is to have both color pages and black-and-white pages formed thereupon, the sheet has the color pages printed with the color MFP 104, following which the sheet is supplied from the hand feed tray 1036 provided to the black-and-white MFP 105, so as to print the black-and-white pages on the sheet with the black-and-white MFP 105.

First, the PDL unit 205 of the color MFP 104 sequentially performs raster image processing (RIP) from the first page in the job received in Step 1803, and following RIP stores the color components (cyan (C), magenta (M), Yellow (Y), and black (K)) in the semiconductor memory 605 for each page. The stored image is subjected to color/monochrome determining by the CPU 603 one page at a time to be formed on one sheet (Step 2000). The determination uses the sampling cycle received in Step 1802, and is based on whether there is a component other than the black (K) component, i.e., any of the C, M, or Y, components, at each sampling point in the semiconductor memory 605. At this time, in order to increase speed, the color/monochrome determining is cancelled whenever even a single color (CMY) component point is found in the sampling points, since this means that the page is a color image, and the page is processed in the color MFP 104 as a color page. In the event that there is not even a single color (CMY) component point in the sampling points in the page, the page is processed at the black-and-white MFP 105 as a black-and-white page. In the event that the determination results of Step 2000 indicate a color page, information indicating that the page with that page number is a color page is transmitted to the black-and-white MFP 105, and in the event that the determination results of Step 2000 indicate a black-and-white page, information indicating that the page with that page number is a black-and-white page is transmitted to the black-and-white MFP 105 (Step 2001).

Subsequently, a judgment is made regarding whether or not only color pages are to be formed on one sheet (Step 2002). In the event that the judgment is made that only color pages are to be formed on one sheet, the printing is performed by the color MFP 104 (Step 2003), and the sheet is discharged (Step 2004).

In the event that the judgment is not made that only color pages are to be formed on one sheet in Step 2002, judgment is made regarding whether or not both color pages and black-and-white pages are to be formed on the sheet (Step 2005). In the event that the judgment is not made that both color pages and black-and-white pages are to be formed on the sheet, only color pages are printed by the color MFP 104 (Step 2006). Subsequently, the sheet printed by the color MFP 104 is discharged (Step 2007).

Following discharging of the sheet printed by the color MFP 104 in Steps 2004 or 2007, or in the event that the judgment is not made in Step 2005 that both color pages and black-and-white pages are to be formed on one sheet, a judgment is made regarding whether or not all sheets to be formed with the color MFP 104 have been formed, i.e., whether the job has ended (Step 2008).

In the event that the job has not ended, pages to be formed on the following sheet are searched (Step 2009), and the flow returns to the color/monochrome determining in Step 2000. Steps 2000 through 2007 are repeated to the last page unless there is a job cancellation interruption, and the job at the MFP 104 ends.

[Control at the Black-and-White MFP]

Figure 21:
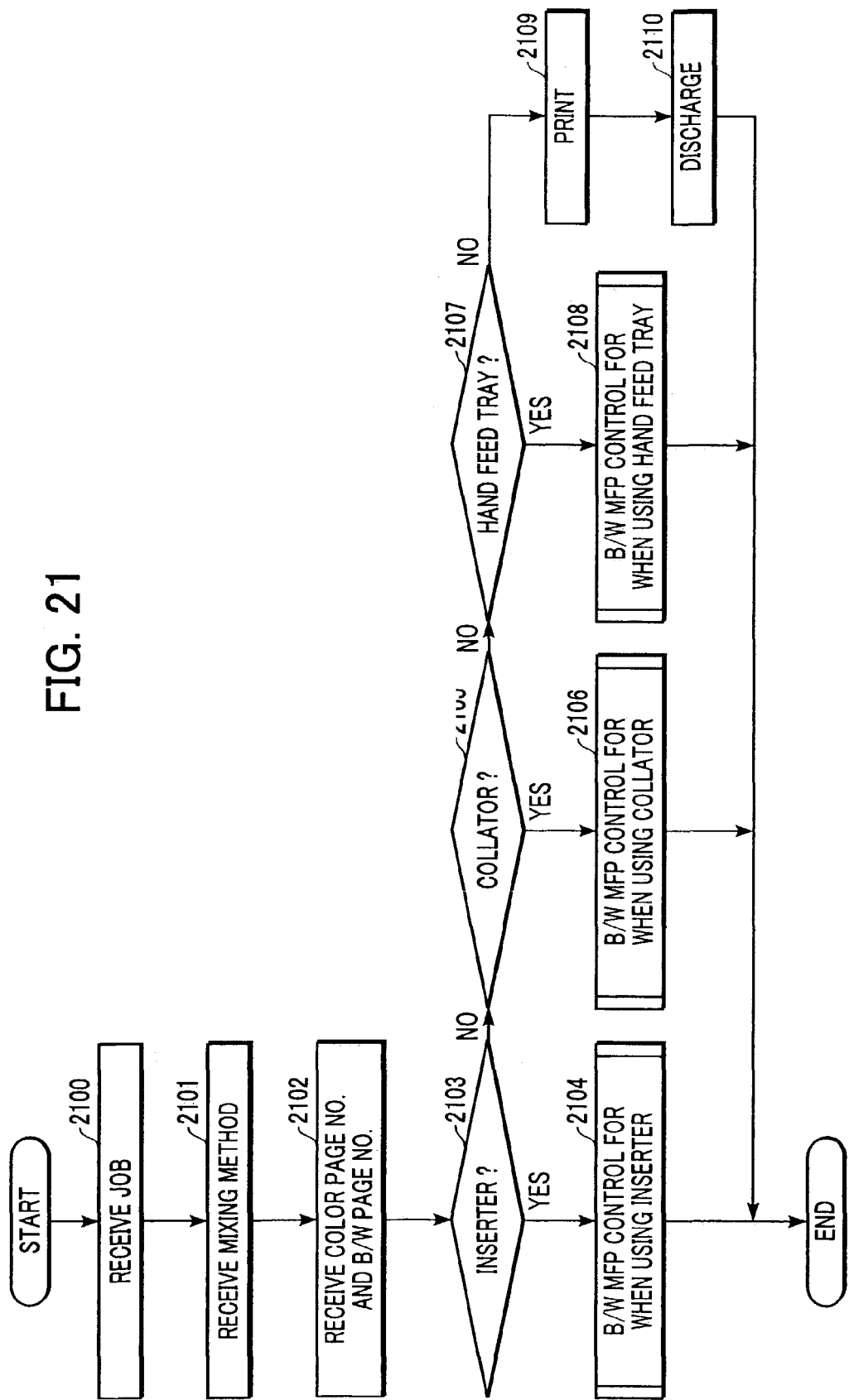
FIG. 21 is a flowchart illustrating control of a black-and-white MFP.

Next, control at the black-and-white MFP 105 side will be described with reference to FIG. 21. The program for executing this flowchart is stored in the black-and-white MFP 105, and is executed by a CPU of the black-and-white MFP 105. Color/monochrome determination has already been executed by the color MFP 104, so there is no need to repeat the determining at the black-and-white MFP 105. Accordingly, the black-and-white MFP 105 only renders by RIP and prints pages with the image numbers notified in Steps 1816, 1901, and 2001. First the job contents transmitted in Steps 1703, 1706, or 1711 are received (Step 2100) Next, information transmitted from the server computer 102 in Steps 1713, 1715, or 1717, regarding which mixing method to use (inserter, collator, or hand feed tray) is received (Step 2101). Next, the color page numbers and the black-and-white page numbers transmitted in Step 1816, 1901, or 2001, are received (Step 2102).

Next, a judgment is made whether or not to use the inserter for mixing, based on the information regarding which mixing method to use that has been received in Step 2101 (Step 2103). In the event that the judgment is made to use the inserter, the flow proceeds to the later-described control of the black-and-white MFP for using the inserter (Step 2104). In the event that the judgment is not made to use the inserter in Step 2103, judgment is made whether or not to use the collator for mixing (Step 2105). In the event that the judgment is made to use the collator, the flow proceeds to the later-described control of the black-and-white MFP for using the collator (Step 2106). In the event that the judgment is not made to use the collator in Step 2105, judgment is made regarding whether or not to use the hand feed tray (Step 2107) in the event that judgment is made to use the hand feed tray, the flow proceeds to the later-described control of the black-and-white MFP for using the hand feed tray (Step 2108).

In the event that the judgment is not made to use the hand feed tray in Step 2107, this means that no mixing is to be performed, so all pages following rendering by RIP are printed with the black-and-white MFP 105 (Step 2109), and discharged in the stack tray 1202 (Step 2110).

Following black-and-white MFP control for each mixing method in Steps 2104, 2106, or 2108, or sheet discharging in Step 2110, the control at the black-and-white MFP ends.

[Black-and-White MFP Control in the Event of Using Inserter]

Figure 22:
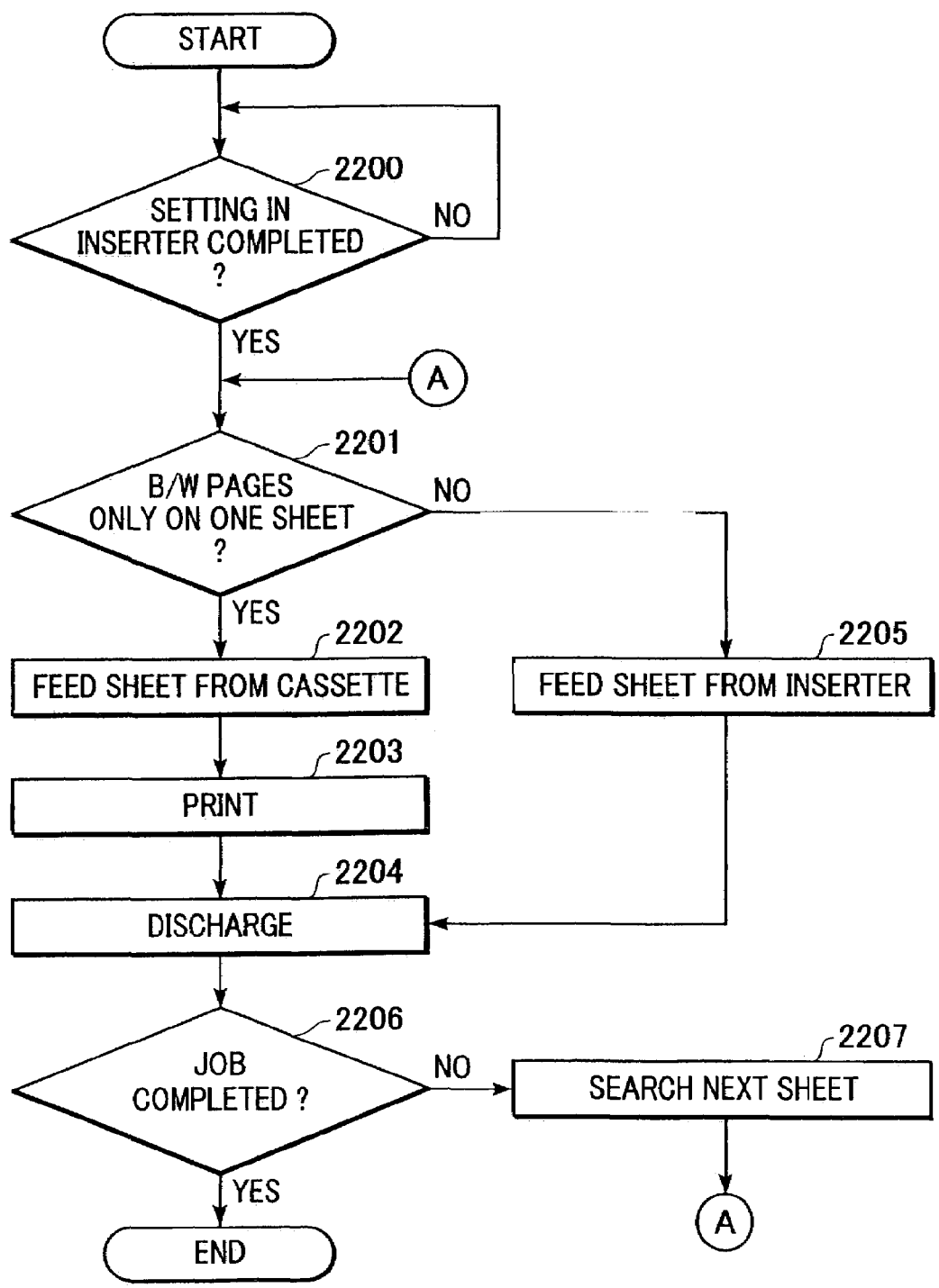
FIG. 22 is a flowchart illustrating control of a black-and-white MFP when using an inserter.
Figure 23:
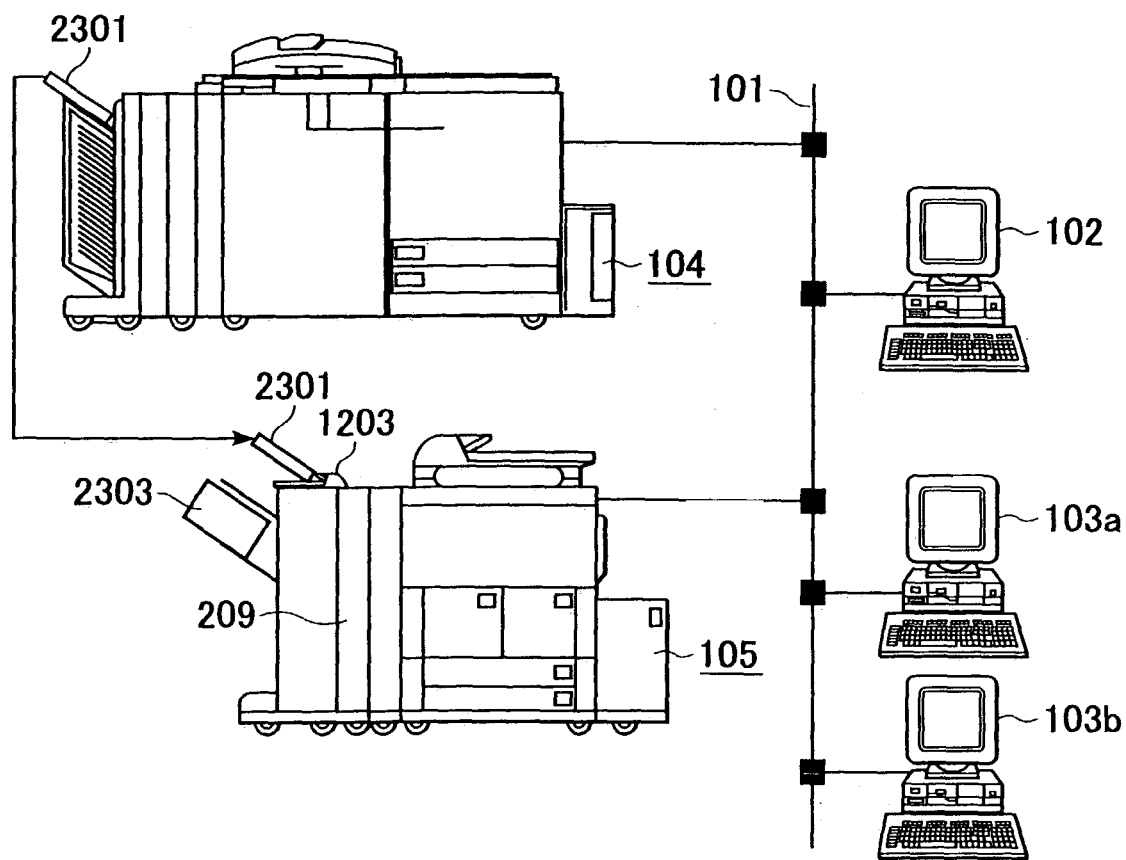
FIG. 23 is a conceptual diagram of mixing color and black-and-white pages when using an inserter.

FIG. 22 is a detailed flowchart relating to Step 2104 (black-and-white MFP control in the event of using the inserter). In FIG. 23, the user sets a color page bundle 2301 printed by the color MFP 104 on the inserter 1203 mounted on the black-and-white MFP 105. At this time, the color page bundle 2301 set on the inserter 1203 corresponds to the page numbers notified in Step 1901.

First, the color MFP 104 detects whether or not the color page bundle printed thereby has been set on the inserter 1203 of the finisher 209, using the sheet detecting sensor 1209, and stands by for printing until set (Step 2200). In the event that the color page bundle is set on the inserter, a judgment is made based on the color page numbers and black-and-white page numbers received in Step 2102, regarding whether only black-and-white pages are to be printed on each sheet, starting from the first sheet (Step 2201), and in the event that only black-and-white pages are to be printed on the sheet, a sheet is supplied from a sheet cassette 1034 or 1035 (Step 2202). Following rendering by RIP, the black-and-white page is printed with the black-and-white MFP 105 (Step 2203), and the sheet upon which the black-and-white page has been printed is discharged into the stack tray 1202 (Step 2204).

In the event that the judgment made in Step 2201 is that not only black-and-white pages are to be printed on one sheet, that sheet already printed by the color MFP 104 and set on the inserter 1203, that one sheet is supplied from the top of the color page bundle loaded on the inserter 1203 (Step 2205), and discharged onto the stack tray 1202 (Step 2204). At the time of discharging, in the event of binding the sheets with the stapler 1205, the sheet is discharged onto the stack tray 1202. But in the event of binding with the saddle stitcher 1207, the sheet is not discharged onto the stack tray 1202 but onto the booklet tray 1208.

Following discharging, a judgment is made regarding whether or not the job has ended (Step 2206), and in the event that the job has not ended, the page with an image is to be formed on the next sheet is searched (Step 2207), and the flow returns to Step 2201. Carrying out this processing to the end of the job yields a job bundle 2303 discharging on the tray with color pages and black-and-white pages mixed.

[Black-And-White MFP Control in the Event of Using Collator]

Figure 24:
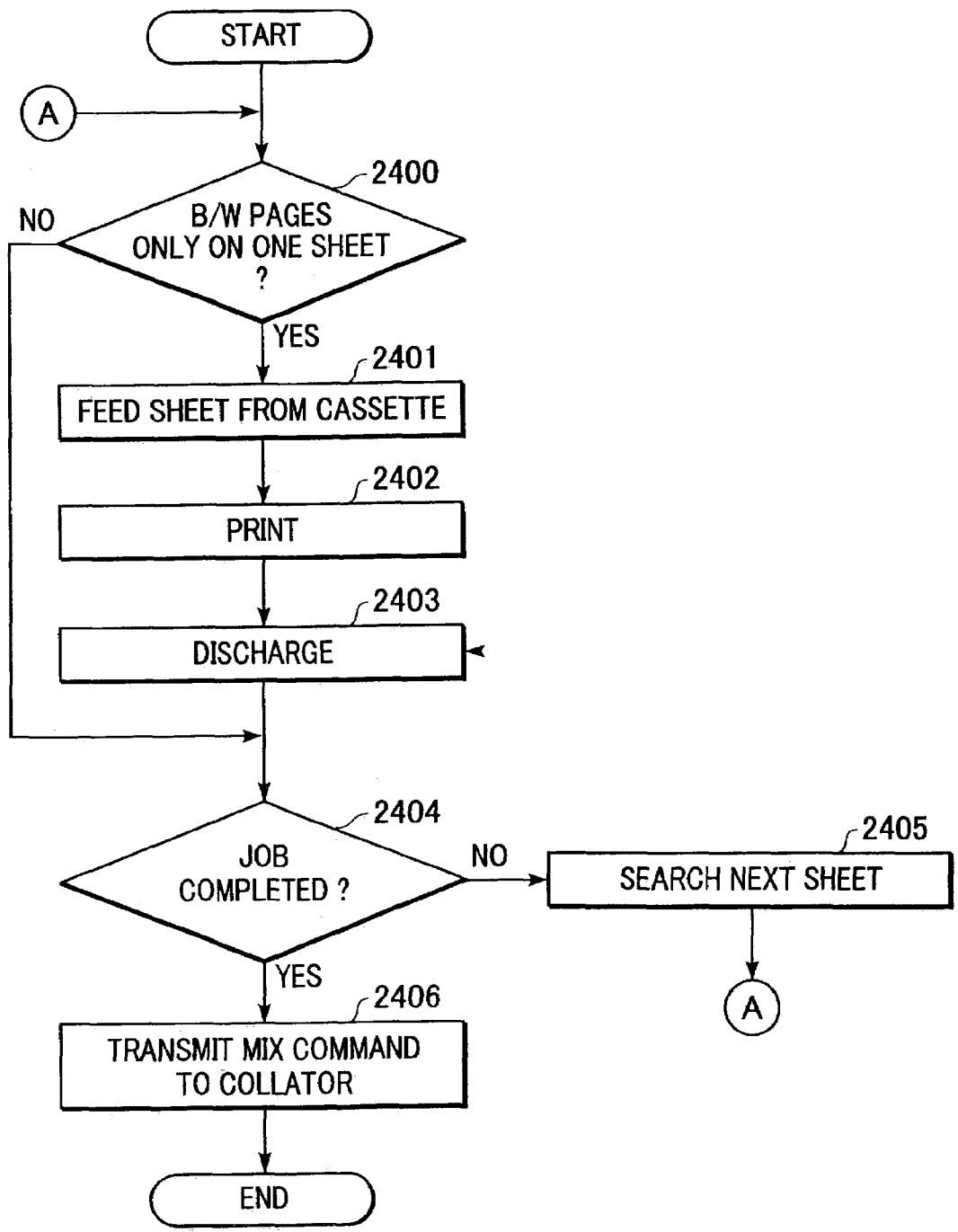
FIG. 24 is a flowchart illustrating control of a black-and-white MFP when using a collator.

FIG. 24 is a detailed flowchart relating to Step 2106 (black-and-white MFP control in the event of using the collator). First, based on the color page numbers and black-and-white page numbers received in Step 2102, a judgment is made whether only black-and-white pages are to be printed on each sheet, starting from the first sheet (Step 2400). In the event that only black-and-white pages are to be printed on the sheet, a sheet is supplied from the sheet cassette 1034 or 1035 (Step 2401), and following rendering by RIP, the black-and-white page is printed with the black-and-white MFP 105 (Step 2402), and the sheet upon which the black-and-white page has been printed is discharged into the stack tray 1202 (Step 2403).

At the time of discharging, in the event of binding the sheets with the stapler 1205, the sheet is discharged onto the stack tray 1202. But, in the event of binding with the saddle stitcher 1207, the sheet is not discharged onto the stack tray 1202 but onto the booklet tray 1208.

Following discharging in Step 2403, or in the event that the judgment made in Step 2400 is that not only black-and-white pages are to be printed on the sheet, judgment is made regarding whether or not the job has ended (Step 2404). In the event that the job has not ended, the page with an image is to be formed on the next sheet is searched (Step 2405), and the flow returns to Step 2400. In the event that the judgment made in Step 2404 is that the job has ended, a mixing command is transmitted to the collator 106 (Step 2406), and control at the black-and-white MFP ends.

[Black-and-White MFP Control in the Event of Using Hand Feed Tray]

Figure 25:
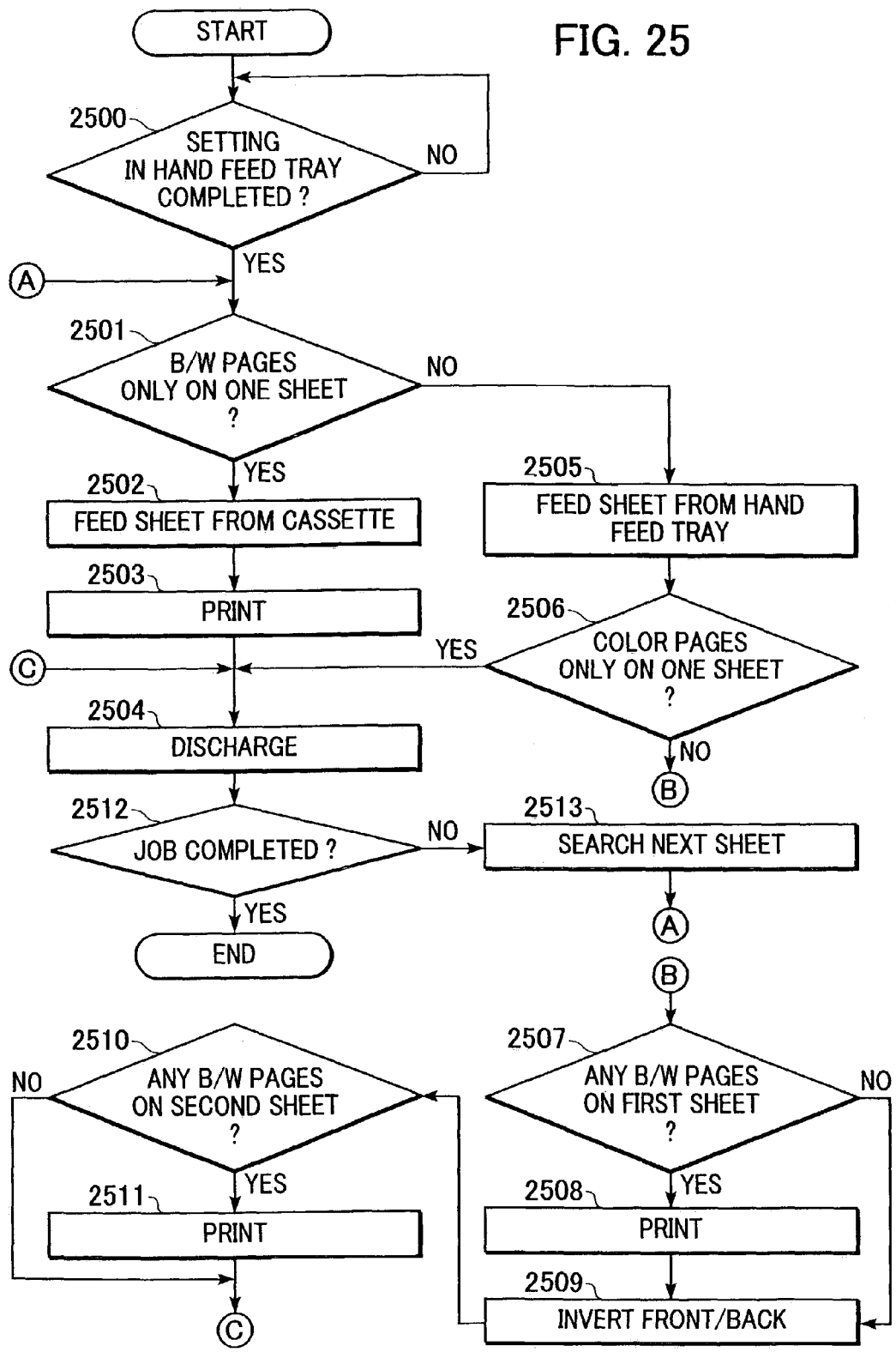
FIG. 25 is a flowchart illustrating control of a black-and-white MFP when using a hand feed tray.

FIG. 25 is a detailed flowchart relating to Step 2108 (black-and-white MFP control in the event of using the hand feed tray). First, the color MFP 104 detects whether or not the color page bundle printed thereby has been set on the hand feed tray 1036 of the black-and-white MFP 105, using the sheet detecting sensor 1070, and stands by for printing until set (Step 2500).

In the event that the color page bundle is set on the hand feed tray 1036, a judgment is made based on the color page numbers and black-and-white page numbers received in Step 2102 whether only black-and-white pages are to be printed on each sheet, starting from the first sheet (Step 2501). In the event that only black-and-white pages are to be printed on the sheet, a sheet is supplied from the sheet cassette 1034 or 1035 (Step 2502), and following rendering by RIP, the black-and-white page is printed with the black-and-white MFP 105 (Step 2503), and the sheet upon which the black-and-white page has been printed is discharged into the stack tray 1202 (Step 2504).

In the event that the judgment made in Step 2501 is that not only black-and-white pages are to be printed on one sheet, one sheet is supplied from the top of the color page bundle loaded on the hand feed tray 1036 (Step 2505). Subsequently, a judgment is made regarding whether or not only color pages are to be formed on a sheet (Step 2506), and in the event that only color pages are to be formed, all-face color printing has already been performed by the color MFP 104, so the sheet fed from the hand feed tray 1036 is discharged onto the stack tray 1202 (Step 2504).

At the time of discharging, in the event of binding the sheets with the stapler 1205, the sheet is discharged onto the stack tray 1202. But in the event of binding with the saddle stitcher 1207, the sheet is not discharged onto the stack tray 1202 but onto the booklet tray 1208.

In the event that the judgment made in Step 2506 is that not only color pages are to be printed on one sheet, a judgment is made whether or not black-and-white pages exist on the first face of the sheet (Step 2507). The face of the sheet facing the image formation unit at this point is defined as the first face, and the face reverse to the first face is defined as the second face. In the event that a black-and-white page exists on the first face of the sheet, following rendering by RIP, the black-and-white page is printed with the black-and-white MFP 105 (Step 2508), the sheet is reversed front and back by the flapper 1050 (Step 2509), and the sheet is transported to a position for formation of an image on the second face thereof. In the event, the judgment made in Step 2507 is that a black-and-white page does not exist on the first face of the sheet, the sheet is passed over the transfer belt 1038 with no formation of image and is reversed front and back by the flapper 1050 (Step 2509), and is transported to a position for formation of an image on the second face thereof.

Following front and back reversal in Step 2509, a judgment is made whether or not black-and-white pages exist on the second face of the sheet (Step 2510). In the event that a black-and-white page exists on the second face of the sheet, following rendering by RIP, the black-and-white page is printed.

(Step 2511), and Discharged on the Stack Tray 1202 (Step 2504).

Following discharging in Step 2504, a judgment is made regarding whether or not the job has ended (Step 2512), and in the event that the job has not ended, the page with an image is to be formed on the next sheet is searched (Step 2513), and the flow returns to Step 2501. Carrying out this processing to the end of the job yields a job bundle 2303 discharged on the tray with color pages and black-and-white pages mixed.

[Control at Collator]

Figure 26:
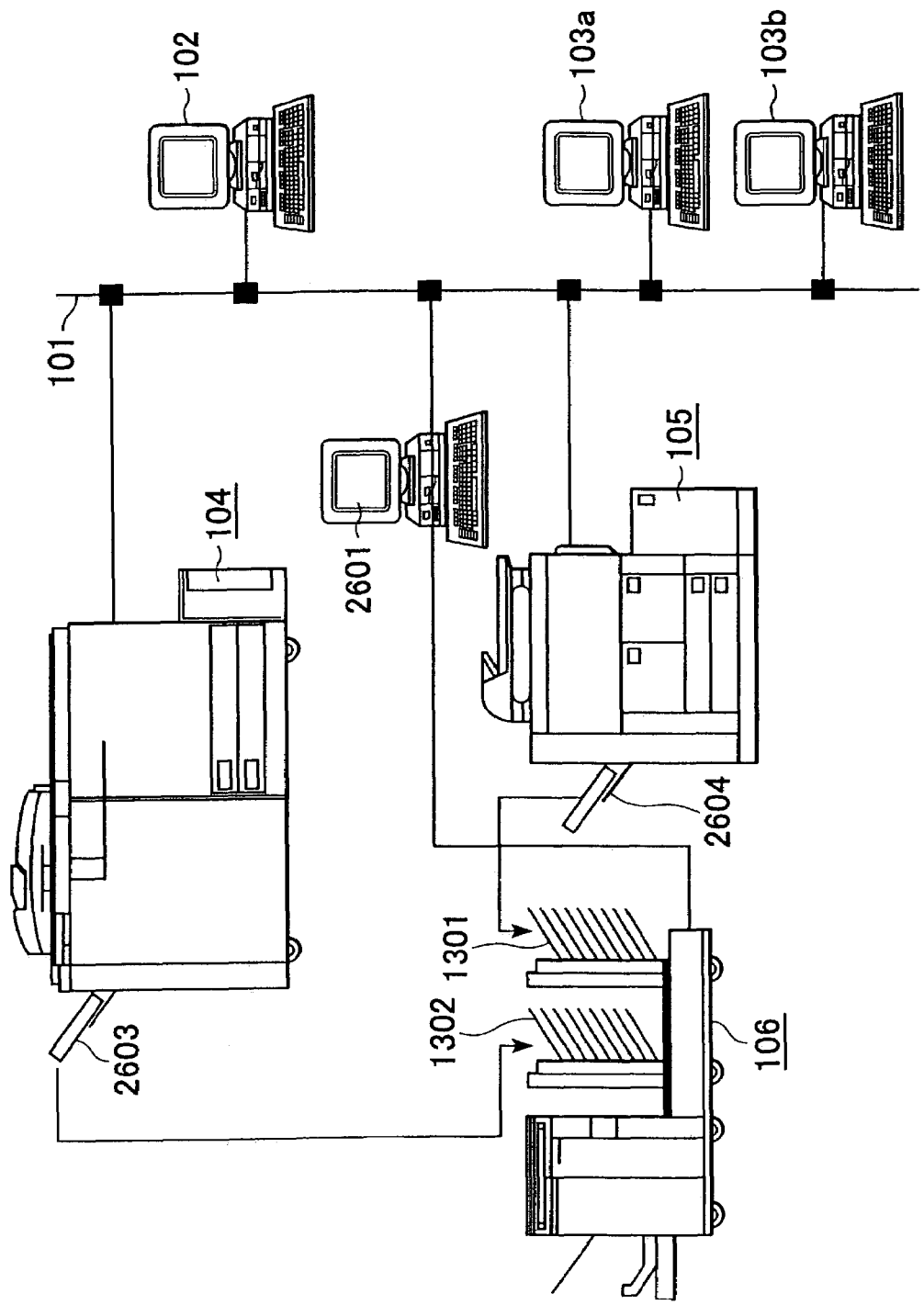
FIG. 26 is a conceptual diagram of mixing color and black-and-white pages when using a collator.

As shown in FIG. 26, a computer 2601 controlling the collator 106 is connected to the network 101. This drawing illustrates a state where the computer 2601 has determined to set the sheets output from the color MFP 104 in the input bin unit 1302, and the sheets output from the black-and-white MFP 105 in the input bin unit 1301. Mixing the sheet bundles printed with the color MFP 104 and black-and-white MFP 105 by the collator 106 connected to the network enables the color MFP 104 and black-and-white MFP 105 to be run simultaneously, so the amount of time that the MFPs are tied up can be reduced.

Figure 27:
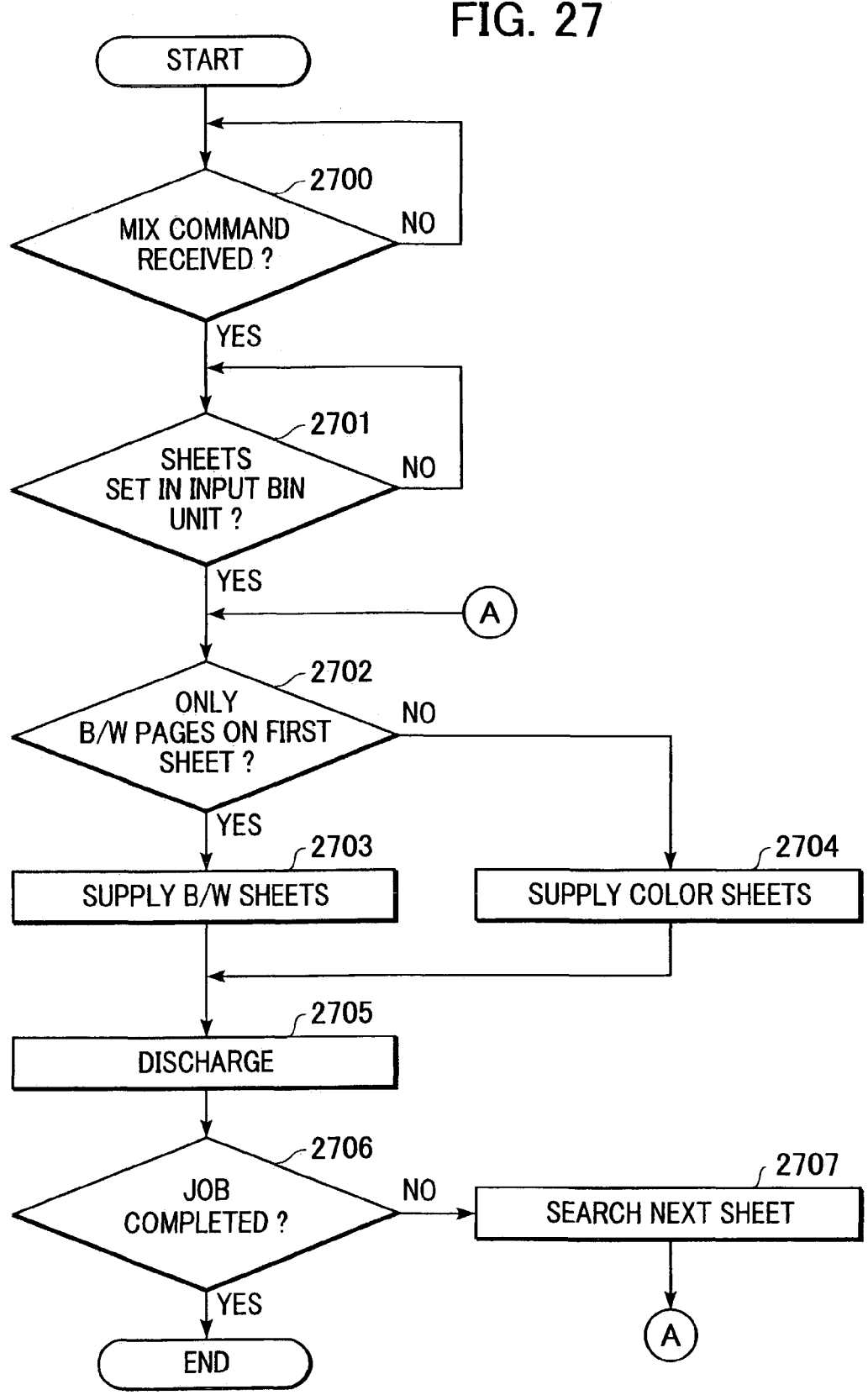
FIG. 27 is a flowchart illustrating control of the collator.

Control at the collator will be described with reference to FIG. 27. First, in Step 2406, the collator stands by until receiving a mixing command transmitted from the black-and-white MFP 105 (Step 2700). Upon receiving the mixing command, whether or not color sheets output from the color MFP 104 are set in the input bin unit 1302 is detected by the sheet detecting sensor 1307, of whether or not black-and-white sheets output from the black-and-white MFP 105 are set in the input bin unit 1301 is detected by the sheet detecting sensor 1306, the flow stands by until the color sheets and the black-and-white sheets are set (Step 2701).

In Step 2701, upon detection of the black-and-white sheets and color sheets having been set in the respective input bin units 1301 and 1302, a judgment is made regarding whether or not only black-and-white pages are to be formed on one sheet, based on the color page numbers and blackand-white page numbers transmitted in Step 1901 (Step 2702). In the event that only black-and-white pages are to be formed on one sheet, i.e., in the event that the sheet has been printed by the black-and-white MFP 105, the black-and-white sheet is fed from the input bin unit 1301 (Step 2703). In the event that the judgment is not made that only black-and-white pages are to be formed on one sheet in Step 2702, i.e., in the event that the sheet has been printed by the color MFP 104, the color sheet is fed from the input bin unit 1302 (Step 2704).

The sheets fed in Steps 2703 and 2704 are stored in the finishing unit 1303 and subjected to post-processing according to user settings such as Z-folding by a Z-folder 1314, binding with the stapler 1315, punching with the puncher 1316, and so forth, and the mixed sheets are discharged in the sorting bin unit 1305 (Step 2705). Upon discharge, a judgment is made regarding whether or not the job has ended (Step 2706). In the event that the job has not ended, the page with an image is to be formed on the next sheet is searched (Step 2707), and the flow returns to Step 2702. Carrying out this processing to the end of the job yields a sheet bundle with color pages and black-and-white pages mixed.

[Making Multiple Copies]

Generating output of multiple copies with the above method, will now be described. As an example, there is a job with pages 1 through 10, of which pages 1, 3, 5, 7, and 8 are color pages, and a total of three copies of this job are to be made. First, all of the color pages are rendered by RIP and stored in the large-capacity memory 604, and the pages are printed out in the order of 1, 3, 5, 7, 8, 1, 3, 5, 7, 8, 1, 3, 5, 7, and 8, thus forming a color print bundle.

For printing at the black-and-white MFP 105, the pages 2, 4, 6, 9, and 10 are rendered by RIP and stored in the large-capacity memory 604 of the black-and-white MFP 105, and the pages are printed out in the order of 2, 4, 6, 9, 10, 2, 4, 6, 9, 10, 2, 4, 6, 9, and 10. Mixing the sheets printed by the color MFP 104 and the black-and-white MFP 105 using a mixing method specified in the driver window shown in FIG. 15 (inserter, collator, or hand feed tray) yields three sets of sheet bundles of pages 1 through 10. Outputting in this order allows each set to be subjected to post-processing at the finisher 209 and the finishing unit 1303 of the collator, such as stapling and the like.

Although the above description of the embodiment involved an arrangement for mixing the sheets using an inserter where color/black-and-white page determination is performed with the color MFP 104, and mixing is performed with the inserter connected to the black-and-white MFP 105, these may be reversed. That is to say, a configuration may be made wherein color/black-and-white page determination is performed with the black-and-white MFP 105, and mixing is performed with an inserter connected to the color MFP 104. In the event of outputting sheets with images of color pages and black-and-white pages on the same sheet, the same results as above can be obtained by printing with the color MFP 104 instead of the black-and-white MFP 105.

Although the above description of the embodiment involved an arrangement for mixing the sheets using a collator wherein color/black-and-white page determination is performed with the color MFP 104, and printing the black-and-white pages is performed with the black-and-white MFP 105, these may be reversed. That is to say, a configuration may be made wherein color/black-and-white page determination is performed at the black-and-white MFP 105, and color pages are printed at the color MFP 104. In the event of outputting sheets with images of color pages and black-and-white pages on the same sheet, the same results as above can be obtained by printing with the color MFP 104 instead of the black-and-white MFP 105.

Although the above description of the embodiment involved an arrangement for mixing the sheets using a hand feed tray where color/black-and-white page determination at the color MFP 104 and performing page mixing using the hand feed tray provided to the black-and-white MFP 105, these may be reversed. That is to say, a configuration may be made where color/black-and-white page determination is made at the black-and-white MFP 105 and performing page mixing using the hand feed tray provided to the color MFP 104. In the event of outputting sheets with images of color pages and black-and-white pages on the same sheet, the same results as above can be obtained by printing only the black-and-white pages with the black-and-white MFP 105 and printing the color pages with the color MFP 104.

Further, although the above description of the embodiment involved an arrangement wherein a judgment regarding whether or not a color page and a black-and-white page are to be formed on a single sheet under automatic separation settings is carried out by the color MFP 104 or the black-and-white MFP 105, this operation may be performed by the server computer 102 or the client computer 103 to which the driver program has been installed. In this case, the server computer 102 or the client computer 103 judges whether a page is a color page or a black-and-white pages, following which the image information of the page to be formed on a sheet to be printed by the color MFP 104 is transmitted to the color MFP 104, and the image information of the page to be formed on a sheet to be printed by the black-and-white MFP 105 is transmitted to the black-and-white MFP 105. Notification of the color page numbers and black-and-white page numbers can also be performed by the server computer 102 or the client computer 103 to which the driver program has been installed, thereby yielding the same results as the above-described embodiment.

Moreover, although the above description of the embodiment involved an arrangement where print jobs are input from the server computer 102 or the client computer 103, original image data read in with a scanner may be used as well.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image formation system including a color image formation apparatus and a black-and-white image formation apparatus, the image formation system comprising:

a color image forming section provided in the color image formation apparatus, for forming a color image;

a black-and-white image forming section provided in the black-and-white image formation apparatus, for forming a black-and-white image;

a determining section for determining whether each of pages in an input job in which both a color page and a black-and-white page exist is a color page or a black-and-white page;

a controller for controlling the color image forming section to form an image for the color page and controlling the black-and-white image forming section to form an image for the black-and-white page according to the determination result of the determining section; and a selecting section for selecting one of a first mode and a second mode, the first mode being a mode in which, in a case where both a color page and a black-and-white page are to be formed on a single sheet, images for all the pages to be formed on the single sheet are formed by the color image forming section, the second mode being a mode in which, in a case where both a color page and a black-and-white page are to be formed on a single sheet, an image for the color page to be formed on the single sheet is formed by the color image forming section and an image for the black-and-white page to be formed on the single sheet is formed by the black-and-white image forming section, wherein the selecting section selects the first mode in a case where sheets having images formed thereon beforehand by the color image forming section are mixed without passing through the black-and-white image forming section, and selects the second mode in a case where the sheets are mixed with passing through the black-and-white image forming section.

2. The image formation system according to claim 1, further comprising:

a merging path where sheets on which images are to be formed by the color image forming section or sheets on which images have been formed by the color image forming section, and sheets on which images are to be formed by the black-and-white image forming section or sheets on which images have been formed by the black-and-white image forming section merge; and a sheet feeder for feeding a sheet having an image formed thereon beforehand by the color image forming section or a sheet having an image formed thereon beforehand by the black-and-white image forming section to the merging path, wherein the selecting section selects one of the first mode and the second mode depending on the type of the sheet feeder used.

3. The image formation system according to claim 2, wherein the merging path is located at a position where the sheets on which images are to be formed by the color image forming section and the sheets on which images are to be formed by the black-and-white image forming section merge after completion of image formation, and wherein the selecting section selects the first mode when the sheet feeder that feeds a sheet to the merging path is used.

4. The image formation system according to claim 2, wherein the merging path is located at a position where the sheets on which images are to be formed by the color image forming section or the sheets on which images are to be formed by the black-and-white image forming section merge before completion of image formation, and wherein the selecting section selects the second mode when the sheet feeder that feeds a sheet to the merging path is used.

5. The image formation system according to claim 1, wherein the job in which both a color page and a black-and-white page exist is input from a computer connected to the image formation system.

6. The image formation system according to claim 1, wherein the job in which both a color page and a black-and-white page exist is input from a scanner connected to the image formation system.

7. The image formation system according to claim 1, wherein the color image formation apparatus and the black-and-white image formation apparatus receive the same job.

8. The image formation system according to claim 1, wherein the case where both a color page and a black-and-white page are to be formed a single sheet is one of a case where one side of a sheet having images formed on both sides thereof is a black-and-white page and the other side is a color page, wherein a case where both a color page and black-and-white page are imposed on a single sheet in saddle-stitch book binding, and wherein a case where both a color page and a black-and-white page exist in a single sheet in a reduced layout in which a plurality of reduced pages are arranged on a sheet.

9. A color image formation apparatus connected via a network to a black-and-white image formation apparatus including a black-and-white image forming section, the color image formation apparatus comprising:

a color image forming section for forming a color image on a sheet;

a receiving section for receiving image information; and a selecting section for selecting one of a first mode and a second mode, the first mode being a mode in which, in a case where both a color page and a black-and-white page are to be formed on a single sheet, images for all the pages to be formed on the single sheet are formed by the color image forming section, the second mode being a mode in which, in a case where both a color page and a black-and-white page are to be formed on a single sheet, an image for only the color page to be formed on the single sheet is formed by the color image forming section, wherein the selecting section selects the first mode in a case where sheets having images formed thereon beforehand by the color image forming section are mixed without passing through the black-and-white image forming section, and selects the second mode in a case where the sheets are mixed with passing through the black-and-white image forming section.

10. The color image formation apparatus according to claim 9, wherein sheets on which images are to be formed or have been formed by the black-and-white image forming section provided in the black-and-white image formation apparatus, and sheets on which images are to be formed or have been formed by the color image forming section merge at a merging path, wherein a sheet having an image formed thereon beforehand by the color image forming section or a sheet having an image formed thereon beforehand by the black-and-white image forming section is fed to the merging path by a sheet feeder, wherein the receiving section receives sheet feeder information indicating which sheet feeder is to be used, and wherein the selecting section selects one of the first mode and the second mode according to the sheet feeder information received by the receiving section.

11. The color image formation apparatus according to claim 10, wherein the merging path is located at a position where the sheets on which images are to be formed by the color image forming section and the sheets on which images are to be formed by the black-and-white image forming section merge after completion of image formation, and wherein the selecting section selects the first mode when the sheet feeder that feeds a sheet to the merging path is used.

12. The color image formation apparatus according to claim 11, wherein the sheet feeder is an inserter or a collator.

13. The color image formation apparatus according to claim 11, wherein the sheet feeder is provided in the black-and-white image formation apparatus, and is configured to feed the sheet having an image formed thereon beforehand by the color image forming section, wherein the color image formation apparatus further comprises a determining section for determining whether a received page is a color page or a black-and-white page based on the image information received by the receiving section, and wherein it is determined whether the received page is black-and-white or color according to the determination result of the determining section.

14. The color image formation apparatus according to claim 11, wherein the sheet feeder is provided in the color image formation apparatus, and is configured to feed the sheet having an image formed thereon beforehand by the black-and-white image forming section, and the receiving section receives information indicating a color page or a black-and-white page, the color image formation apparatus further comprising:

a sheet loading section for loading sheets; and a determining section for determining a color page or a black-and-white page based on the information received by the receiving section, wherein, when the determining section determines that only a black-and-white page is to be formed on a single sheet, the sheet having the black-and-white image formed thereon is fed by the sheet feeder, and when the determining section does not determine that only a black-and-white page is to be formed on a single sheet, a sheet is fed from the sheet loading section, and an image is formed on the sheet by the color image forming section.

15. The color image formation apparatus according to claim 10, wherein the merging path is located at a position where the sheets on which images are to be formed by the color image forming section or the sheets on which images are to be formed by the black-and-white image forming section merge before completion of image formation, and wherein the selecting section selects the second mode when the sheet feeder that feeds a sheet to the merging path is used.

16. The color image formation apparatus according to claim 15, wherein the sheet feeder is a hand feed unit.

17. The color image formation apparatus according to claim 15, wherein the sheet feeder is provided in the black-and-white image formation apparatus, and is configured to feed the sheet having an image formed thereon beforehand by the color image forming section, wherein the color image formation apparatus further comprises a determining section for determining whether a received page is a color page or a black-and-white page based on the image information received by the receiving section, and wherein it is determined whether the received page is black-and-white or color according to the determination result of the determining section.

18. The color image formation apparatus according to claim 15, wherein the sheet feeder is provided in the color image formation apparatus, and is configured to feed the sheet having an image formed thereon beforehand by the black-and-white image forming section, and the receiving section receives information indicating a color page or a black-and-white page, the color image formation apparatus further comprising:

a sheet loading section for loading sheets; and a determining section for determining a color page or a black-and-white page based on the information received by the receiving section, wherein, when the determining section determines that only a color page is to be formed on a single sheet, a sheet is fed from the sheet loading section, and an image is formed on the sheet by the color image forming section, when the determining section determines that only a black-and-white page is to be formed on a single sheet, the sheet having the black-and-white image formed thereon is fed from the sheet feeder, and wherein, when the determining section determines that both a color page and a black-and-white page exist on a single sheet, the sheet is fed by the sheet feeder, after which an image for the color page is formed by the color image forming section.

19. A black-and-white image formation apparatus connected via a network to a color image formation apparatus including a color image forming section, the black-and-white image formation apparatus comprising:

a black-and-white image forming section for forming a black-and-white image on a sheet;

a receiving section for receiving image information; and a selecting section for selecting one of a first mode and a second mode, the first mode being a mode in which, in a case where both a color page and a black-and-white page are to be formed on a single sheet, no image is formed by the black-and-white image forming section, the second mode being a mode in which, in a case where both a color page and a black-and-white page are to be formed on a single sheet, an image for only the black-and-white page to be formed on the single sheet is formed by the black-and-white image forming section, wherein the selecting section selects the first mode in a case where sheets having images formed thereon beforehand by the color image forming section are mixed without passing through the black-and-white image forming section, and selects the second mode in a case where the sheets are mixed with passing through the black-and-white image forming section.

20. The black-and-white image formation apparatus according to claim 19, wherein sheets on which images are to be formed or have been formed by the black-and-white image forming section, and sheets on which images are to be formed or have been formed by the color image forming section provided in the color image formation apparatus merge at a merging path;

wherein a sheet having an image formed thereon beforehand by the color image forming section or a sheet having an image formed thereon beforehand by the black-and-white image forming section is fed to the merging path by a sheet feeder, wherein the receiving section receives sheet feeder information indicating which sheet feeder is to be used, and wherein the selecting section selects one of the first mode and the second mode according to the sheet feeder information received by the receiving section.

21. The black-and-white image formation apparatus according to claim 20, wherein the merging path is located at a position where the sheets on which images are to be formed by the color image forming section and the sheets on which images are to be formed by the black-and-white image forming section merge after completion of image formation, and wherein the selecting section selects the first mode when the sheet feeder that feeds a sheet to the merging path is used.

22. The black-and-white image formation apparatus according to claim 21, wherein the sheet feeder is an inserter or a collator.

23. The black-and-white image formation apparatus according to claim 21, wherein the sheet feeder is provided in the color image formation apparatus, and is configured to feed the sheet having an image formed thereon beforehand by the black-and-white image forming section, wherein the black-and-white image formation apparatus further comprises a determining section for determining whether a received page is a color page or a black-and-white page based on the image information received by the receiving section, and wherein it is determined whether the received page is black-and-white or color according to the determination result of the determining section.

24. The black-and-white image formation apparatus according to claim 21, wherein the sheet feeder is provided in the black-and-white image formation apparatus, and is configured to feed the sheet having an image formed thereon beforehand by the color image forming section, the receiving section receives information indicating a color page or a black-and-white page, the black-and-white image formation apparatus further comprising:

a sheet loading section for loading sheets; and a determining section for determining a color page or a black-and-white page based on the information received by the receiving section, wherein, when the determining section determines that only a black-and-white page is to be formed on a single sheet, a sheet is fed from the sheet loading section, and an image is formed on the sheet by the black-and-white image forming section, and wherein, when the determining section does not determine that only a black-and-white page is to be formed on a single sheet, the sheet having the color image formed thereon is fed by the sheet feeder.

25. The black-and-white image formation apparatus according to claim 20, wherein the merging path is located at a position where the sheets on which images are to be formed by the color image forming section or the sheets on which images are to be formed by the black-and-white image forming section merge before completion of image formation, and wherein the selecting section selects the second mode when the sheet feeder that feeds a sheet to the merging path is used.

26. The black-and-white image formation apparatus according to claim 25, wherein the sheet feeder is a hand feed unit.

27. The black-and-white image formation apparatus according to claim 25, wherein the sheet feeder is provided in the color image formation apparatus, and is configured to feed the sheet having an image formed thereon beforehand by the black-and-white image forming section, wherein the black-and-white image formation apparatus further comprises a determining section for determining whether a received page is a color page or a black-and-white page based on the image information received by the receiving section, and wherein it is determined whether the received page is black-and-white or color according to the determination result of the determining section.

28. The black-and-white image formation apparatus according to claim 25, wherein the sheet feeder is provided in the black-and-white image formation apparatus, and is configured to feed the sheet having an image formed thereon beforehand by the color image forming section, and the receiving section receives information indicating a color page or a black-and-white page, the black-and-white image formation apparatus further comprising:

a sheet loading section for loading sheets; and a determining section for determining a color page or a black-and-white page based on the information received by the receiving section, wherein, when the determining section determines that only a black-and-white page is to be formed on a single sheet, a sheet is fed from the sheet loading section, and an image is formed on the sheet by the black-and-white image forming section, wherein, when the determining section determines that only a color page is to be formed on a single sheet, the sheet having the color image formed thereon is fed from the sheet feeder, and wherein, when the determining section determines that both a color page and a black-and-white page exist on a single sheet, the sheet is fed by the sheet feeder, after which an image for the black-and-white page is formed by the black-and-white image forming section.

* * * * *

UNITED STATES PATENT AND TRADEMARK OFFICE
CERTIFICATE OF CORRECTION

PATENT NO. : 7,385,711 B2
APPLICATION NO. : 10/600449
DATED : June 10, 2008
INVENTOR(S) : Watanabe It is certified that error appears in the above-identified patent and that said Letters Patent is hereby corrected as shown below:

ABSTRACT:
    Line 11, "page" should read -- pages --.

COLUMN 6:
    Line 59, "are" should read -- there are --; and
    Line 59, "sent" should read -- is sent --.

COLUMN 7:
    Line 25, "components" should read -- components. --;
    Line 38, "Job," should read -- job, --; and
    Line 65, "Next, The" should read -- Next, the --.

COLUMN 8:
    Line 16, "[Configuration of" should read -- ¶[Configuration of --.

COLUMN 10:
    Line 17, "discharge." should read -- discharged. --; and
    Line 35, "discharged" should read -- discharged. --.

COLUMN 13:
    Line 16, "he" should read -- the --.

COLUMN 15:
    Line 35, "dolor" should read -- color --.

COLUMN 16:
    Line 41, "page-sequence," should read -- page sequence, --.

COLUMN 18:
    Line 15, "(Step 2107) in" should read -- (Step 2107). In --;
    Line 38, "sheet detecting" should read -- sheet-detecting --;
    Line 42, "Step 2102, regarding" should read -- Step 2102 regarding --; and
    Line 66, "is" should be deleted.

UNITED STATES PATENT AND TRADEMARK OFFICE
CERTIFICATE OF CORRECTION

PATENT NO. : 7,385,711 B2
APPLICATION NO. : 10/600449
DATED : June 10, 2008
INVENTOR(S) : Watanabe It is certified that error appears in the above-identified patent and that said Letters Patent is hereby corrected as shown below:

COLUMN 19:
    Line 29, "is" (first occurrence) should be deleted.

COLUMN 20:
    Lines 28-30, "printed. ¶(Step 2511), and Discharged on the Stack Tray 1202 (Step 2504)." should read -- printed (step 2511) and discharged on the stack tray 1202 (step 2504). --;
    Line 34, "is" should be deleted; and
    Line 58, "of" should read -- or --.

COLUMN 21:
    Line 19, "is" (first occurrence) should be deleted.

COLUMN 22:
    Line 28, "pages," should read -- page, --.

Signed and Sealed this

Thirteenth Day of January, 2009

JON W. DUDAS
*Director of the United States Patent and Trademark Office*